(12) United States Patent
Taylor et al.

(10) Patent No.: US 10,060,147 B2
(45) Date of Patent: *Aug. 28, 2018

(54) PORTABLE DISPOSABLE TOILET

(71) Applicant: Process4, Inc., Chagrin Falls, OH (US)

(72) Inventors: Curtis Taylor, Chagrin Falls, OH (US);
Aaron Misener, Chagrin Falls, OH (US)

(73) Assignee: Process4, Inc., Chagrin Falls, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/276,866

(22) Filed: Sep. 27, 2016

(65) Prior Publication Data

US 2017/0016238 A1    Jan. 19, 2017

Related U.S. Application Data

(63) Continuation of application No. 13/323,023, filed on Dec. 12, 2011.

(60) Provisional application No. 61/421,658, filed on Dec. 10, 2010.

(51) Int. Cl.
| | |
|---|---|
| *E04H 1/12* | (2006.01) |
| *E04B 1/348* | (2006.01) |
| *A47K 11/00* | (2006.01) |
| *A47K 11/02* | (2006.01) |
| *A47K 11/04* | (2006.01) |
| *A47K 13/26* | (2006.01) |

(52) U.S. Cl.
CPC ....... *E04H 1/1216* (2013.01); *E04B 1/34869* (2013.01); *A47K 11/00* (2013.01); *A47K 11/02* (2013.01); *A47K 11/04* (2013.01); *A47K 13/26* (2013.01)

(58) Field of Classification Search
CPC .................. E04H 1/1216; E04B 1/34869
USPC .................. 4/449, 460, 476–478; 52/70
See application file for complete search history.

(56) References Cited

U.S. PATENT DOCUMENTS

| | | | | |
|---|---|---|---|---|
| 2,726,803 | A * | 12/1955 | Ketler | B65D 5/14 229/109 |
| 2,754,550 | A * | 7/1956 | Johnson | E04B 1/344 135/100 |
| 2,982,290 | A * | 5/1961 | Hunziker | E04H 15/00 135/128 |
| 3,766,693 | A * | 10/1973 | Richards, Jr. | E04H 1/12 446/109 |
| 3,835,480 | A * | 9/1974 | Harding | E04H 1/1216 4/449 |
| 4,064,662 | A * | 12/1977 | O'Toole | E04B 1/34357 135/115 |
| 4,380,836 | A * | 4/1983 | Braxton | E04B 1/3445 4/449 |

(Continued)

*Primary Examiner* — Erin Deery
(74) *Attorney, Agent, or Firm* — Fay Sharpe LLP

(57) ABSTRACT

A portable toilet that includes a top section, a bottom section, a side wall, and a door system. The top section includes a top wall slot. The bottom section includes a bottom wall slot. The side wall includes a top edge that is removably insertable into the top wall slot. The side wall includes a bottom edge of that is removably insertable into the bottom wall slot. The door system includes a door frame and at least one door. The door frame includes first and second wall side slots. A first side of the side wall is removably insertable into the first wall side slot, and a second side of the side wall is removably insertable into the second wall side slot.

13 Claims, 20 Drawing Sheets

(56) References Cited

U.S. PATENT DOCUMENTS

| | | | | |
|---|---|---|---|---|
| 4,744,111 | A | * | 5/1988 | Tegg ............... E04H 1/1216 4/460 |
| 4,779,388 | A | * | 10/1988 | Gibney ............ E04H 1/1211 52/236.1 |
| 4,831,671 | A | * | 5/1989 | Harding ........... E04H 1/1216 4/460 |
| 5,426,900 | A | * | 6/1995 | Springer ............ A47K 4/00 4/460 |
| 5,448,785 | A | * | 9/1995 | Lin .................. A47K 11/00 4/484 |
| 5,647,074 | A | * | 7/1997 | White, Jr. ......... E03D 9/002 4/312 |
| D452,901 | S | * | 1/2002 | Wieringa ............. D23/299 |
| 6,349,426 | B1 | * | 2/2002 | Wieringa .......... A47K 11/02 4/449 |
| 6,427,256 | B1 | * | 8/2002 | Mullett ............ A47K 11/02 4/449 |
| 6,507,958 | B1 | * | 1/2003 | Tagg ............... E04H 1/1216 4/321 |
| 6,668,392 | B2 | * | 12/2003 | Mason ............. E04H 1/1216 4/449 |
| D519,645 | S | * | 4/2006 | Wright .................. D25/16 |
| D545,451 | S | * | 6/2007 | Urbanek ............... D25/16 |
| D624,663 | S | * | 9/2010 | Christian .............. D25/16 |
| 2003/0208838 | A1 | * | 11/2003 | Mason ............. E04H 1/1216 4/449 |
| 2007/0174955 | A1 | * | 8/2007 | Harris ............. E04H 1/1216 4/476 |
| 2008/0209624 | A1 | * | 9/2008 | Lavoie ............ E04H 1/1216 4/449 |
| 2009/0038066 | A1 | * | 2/2009 | Kallmann ......... A47K 11/02 4/479 |

* cited by examiner

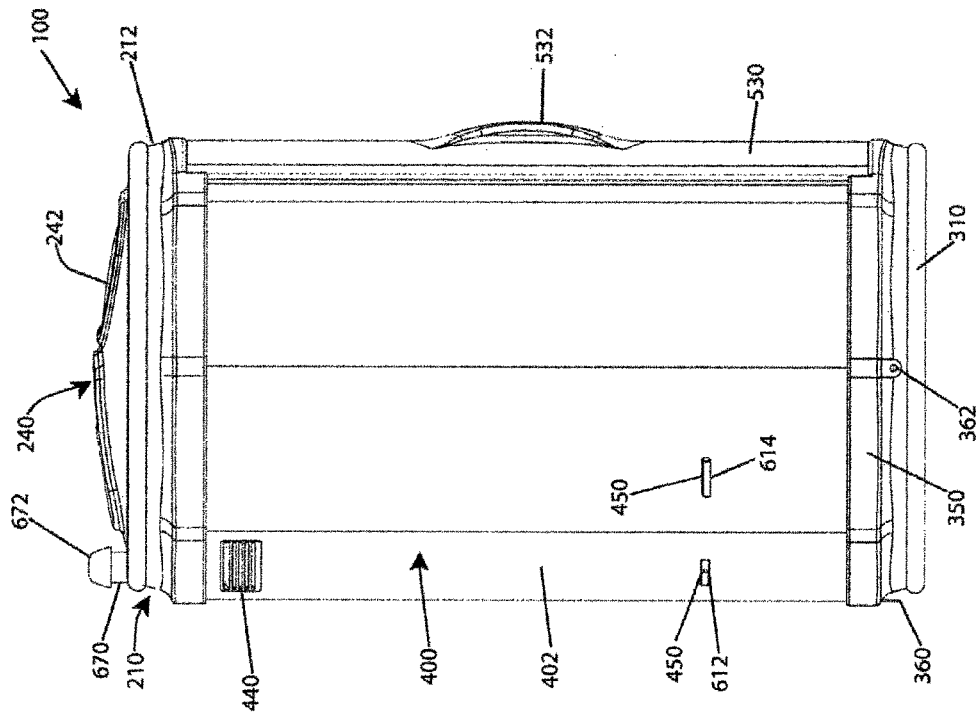
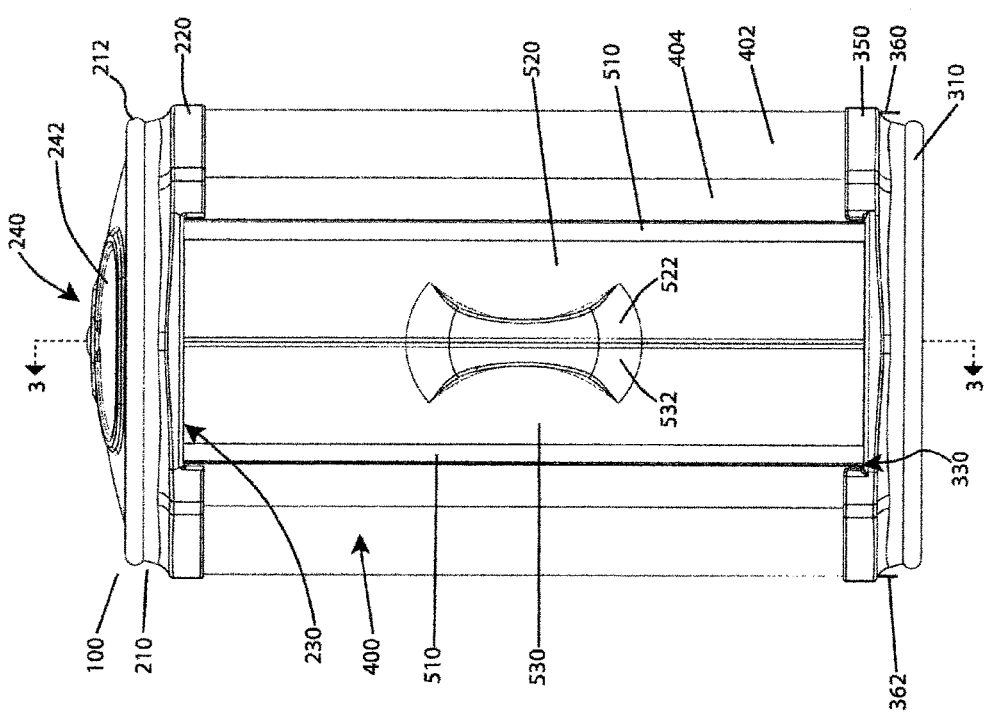

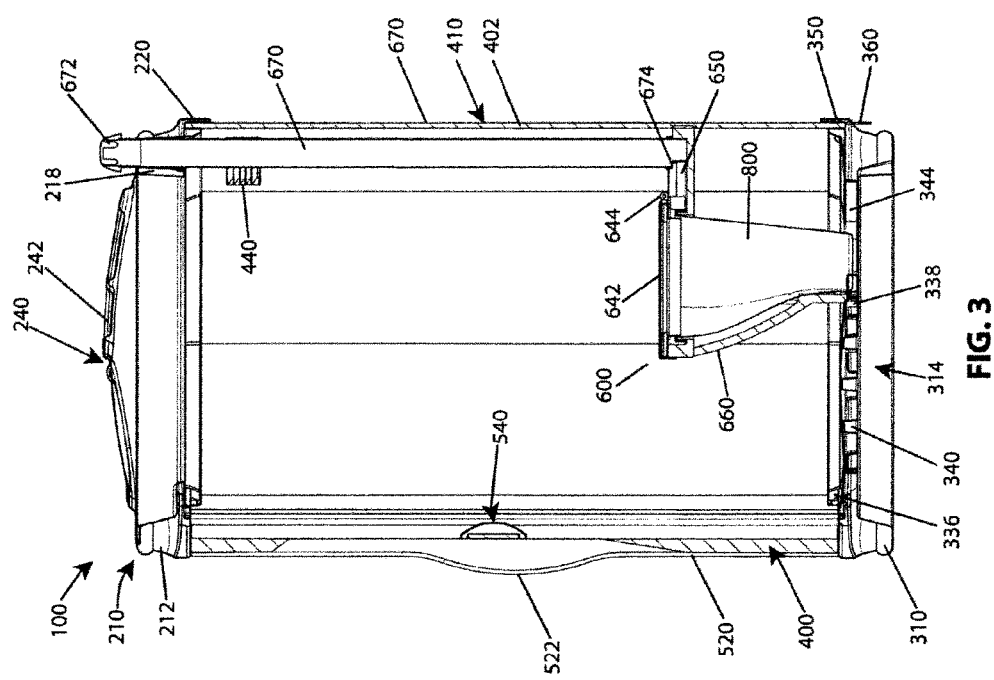

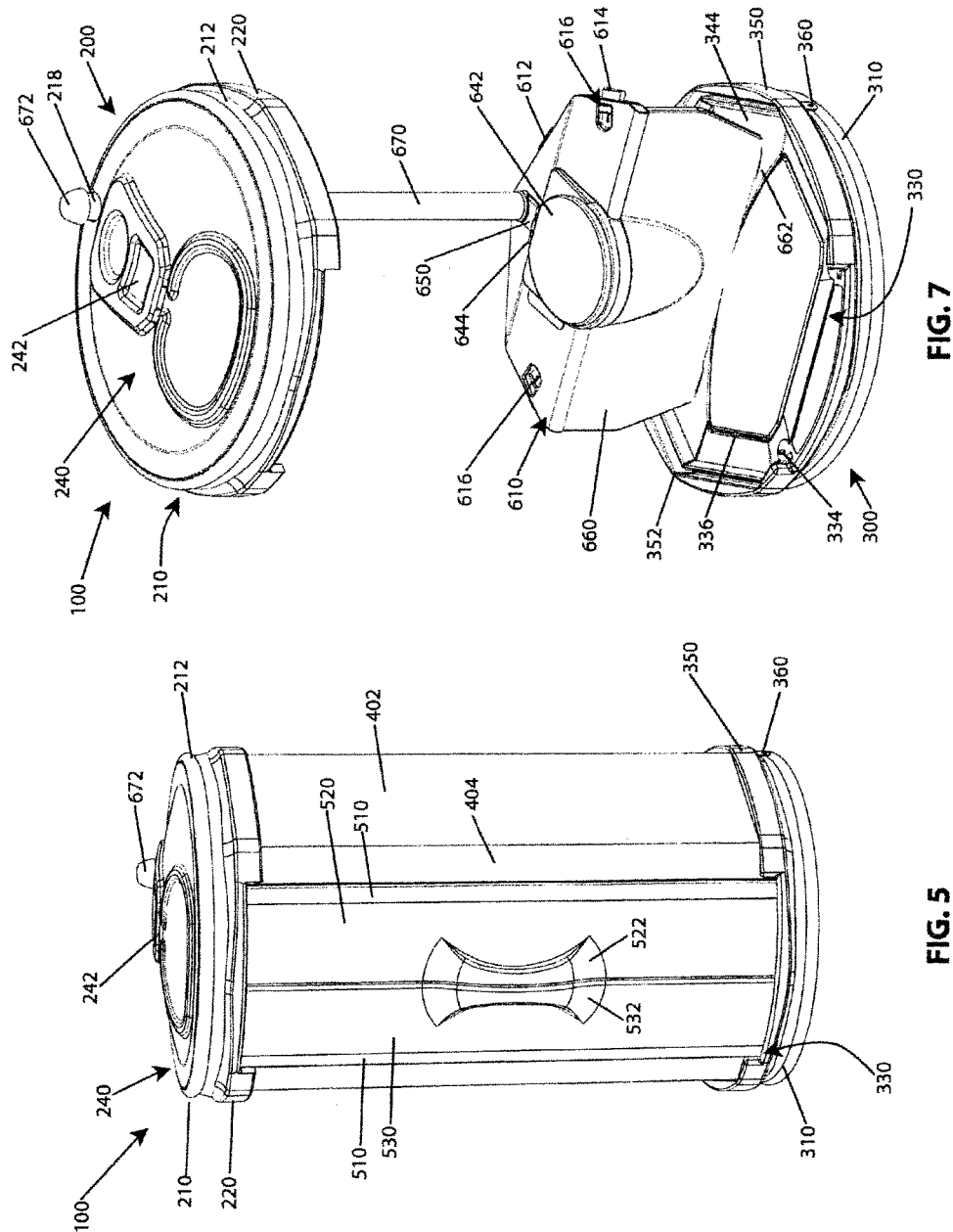

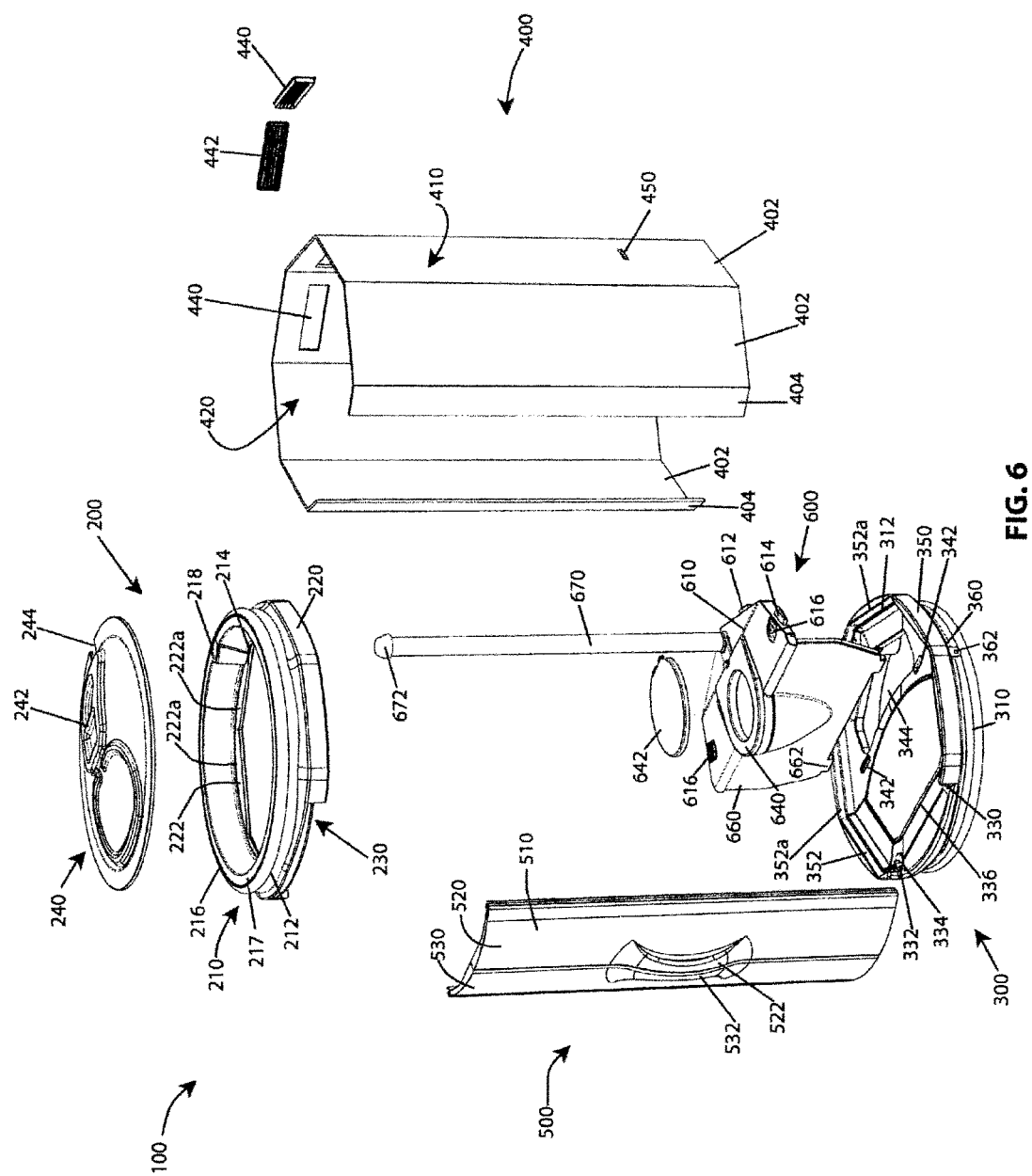

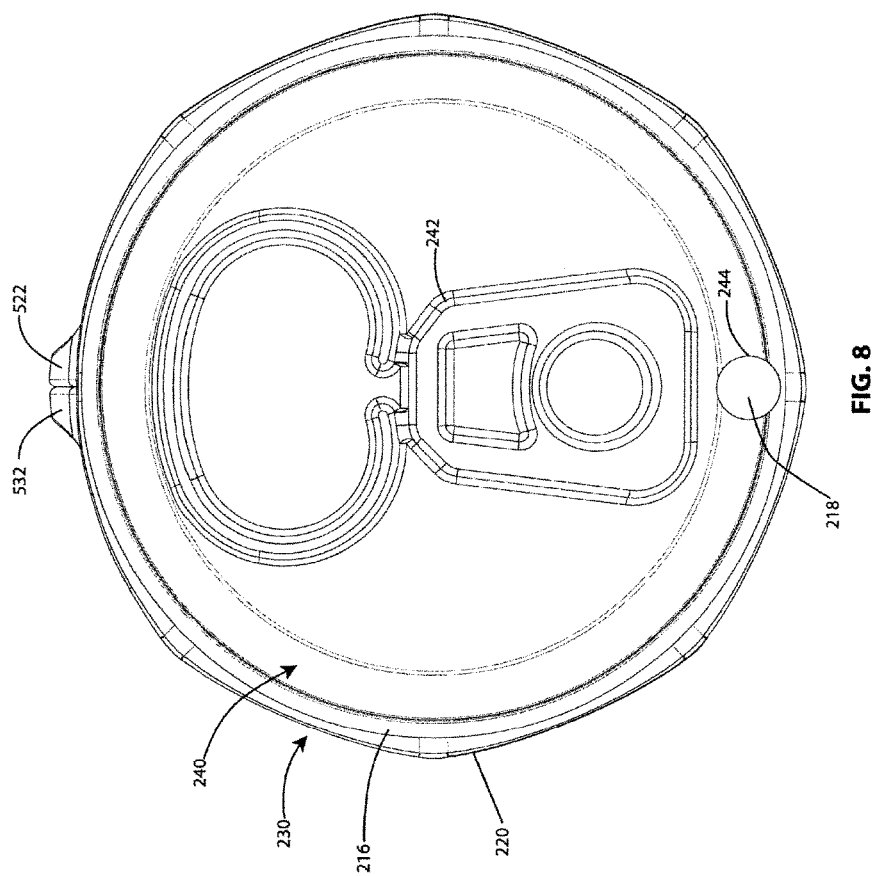

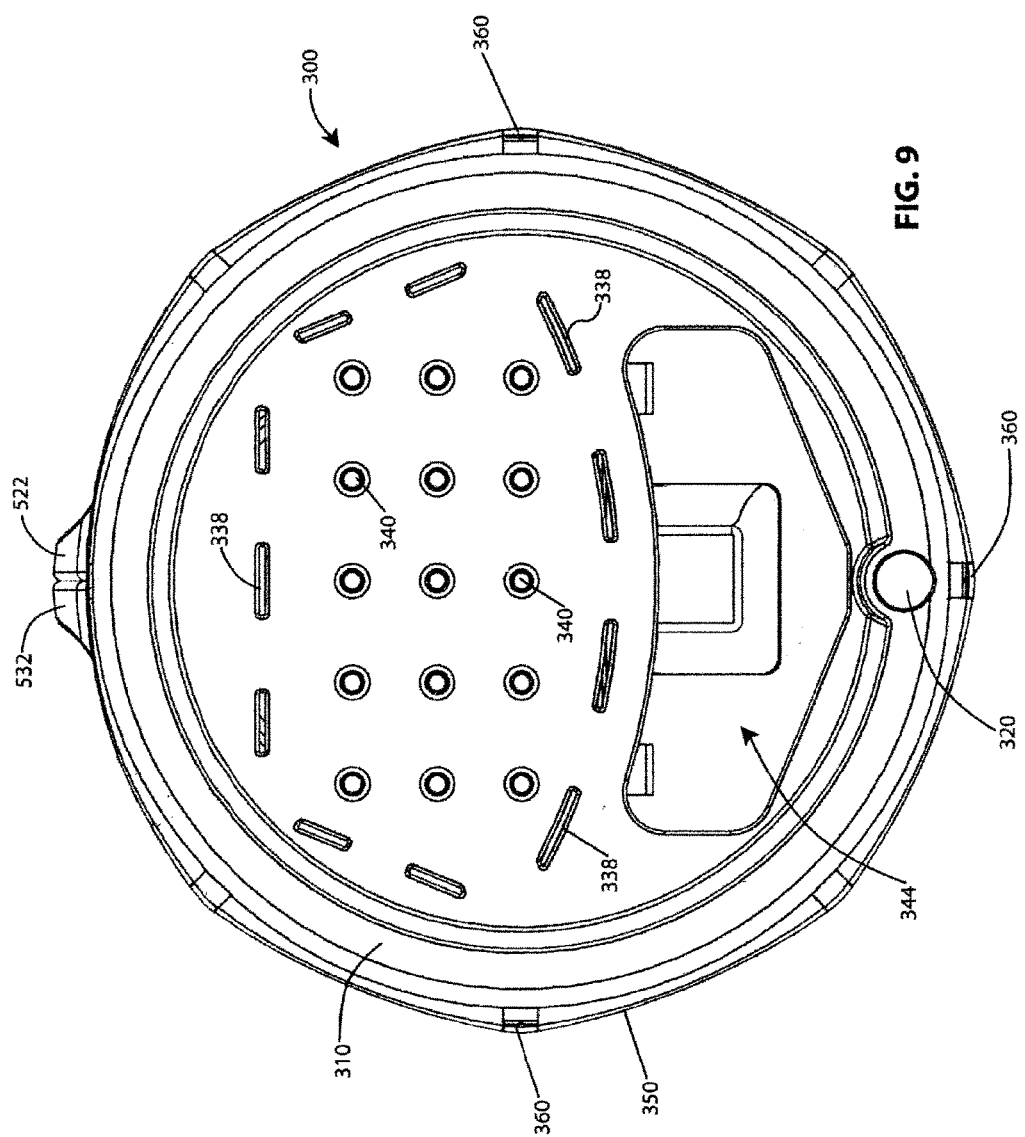

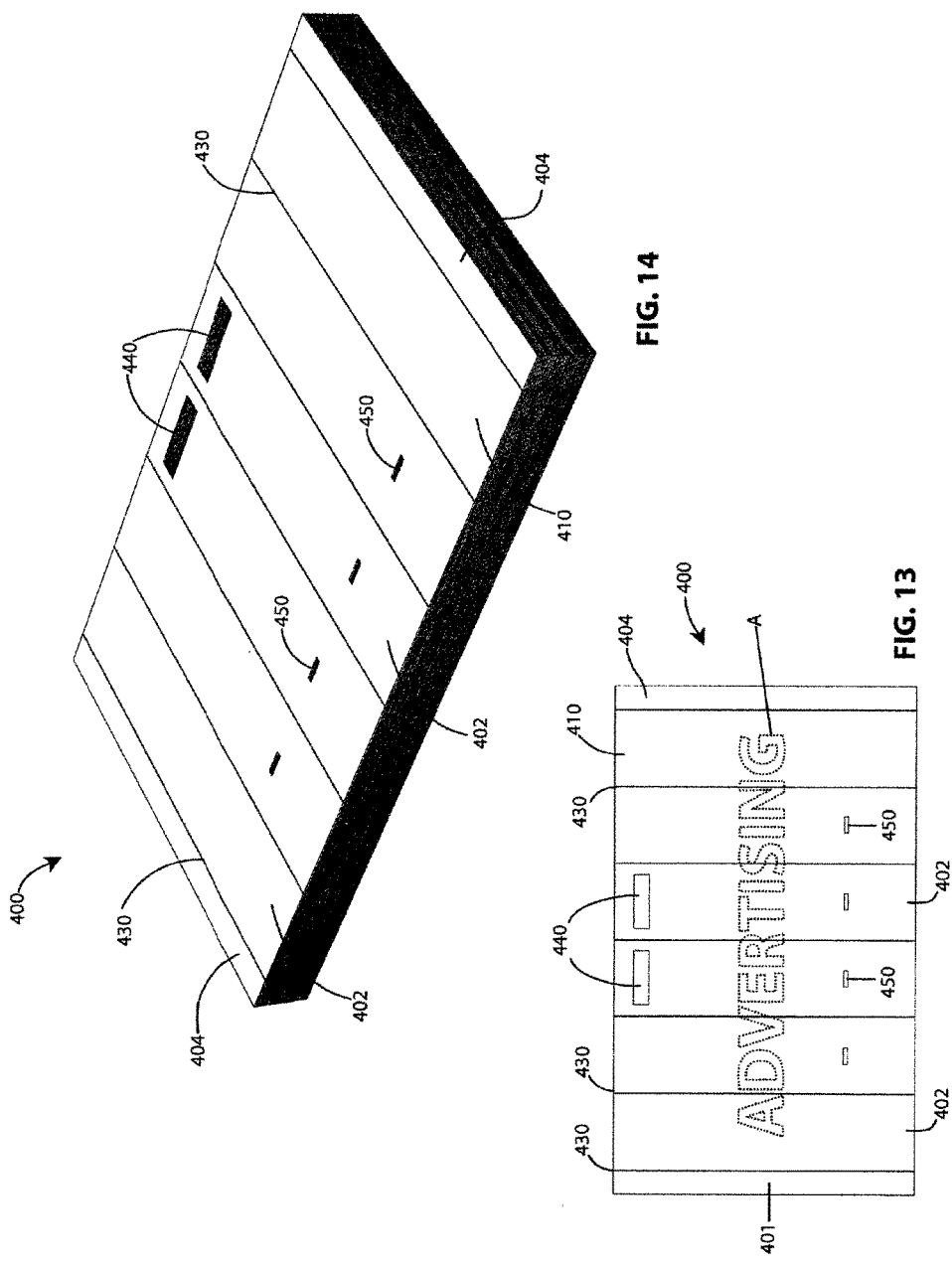

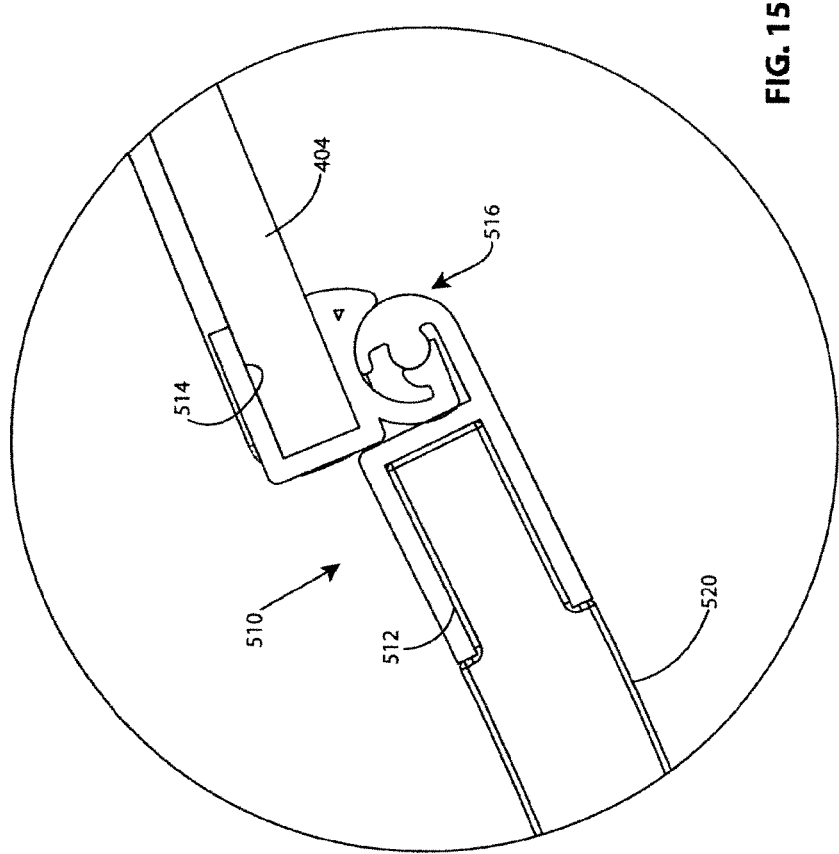

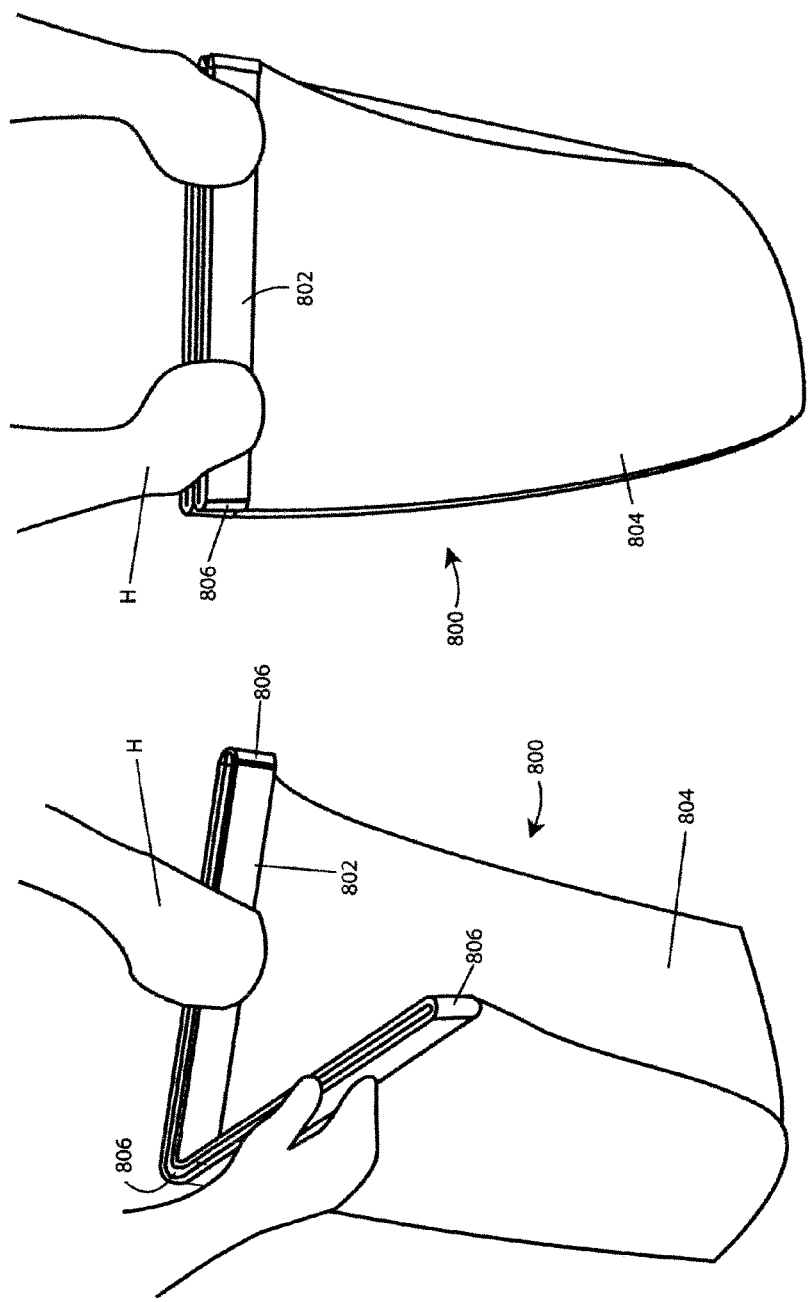

PORTABLE DISPOSABLE TOILET

The present invention is a continuation of U.S. application Ser. No. 13/323,023 filed Dec. 12, 2011, now U.S. Pat. No. 9,518,398, which in turn claims priority on U.S. Provisional Application Ser. No. 61/421,658 filed Dec. 10, 2010, which is incorporated herein by reference.

The present invention is directed to a portable toilet that includes one or more disposable components. The portable toilet has the advantage of being easier to clean, and easier and more convenient to transport.

BACKGROUND OF THE INVENTION

Portable toilets are known in the art. Non-limiting examples of such prior art portable toilets are disclosed in U.S. D624,663; U.S. D545,451; U.S. D519,645; U.S. D452,901; U.S. Pat. No. 6,668,392; U.S. Pat. No. 6,507,958; U.S. Pat. No. 6,427,256; U.S. Pat. No. 5,448,785; U.S. Pat. No. 4,744,111; U.S. Pat. No. 4,380,836; US 2007/0174955; US 2003/0208838; WO 2009/123655; and DE 10342371, all of which are fully incorporated herein by reference.

Prior art portable toilets are commonly modular units that are formed of plastic material. The portable toilets are typically shipped assembled. After used, the complete interior is cleaned and flushed out for subsequent use. Although prior art portable toilets have advantageously solved sanitary problems in locations that have insufficient, few or no bathroom facilities, these prior art portable toilets have several disadvantages.

One disadvantage of prior art portable toilet is the time and difficulty of thoroughly cleaning the portable toilet after use. The interior cavity of the portable toilet must be fully cleaned and sanitized after use. The small interior cavity makes it difficult to access the complete interior cavity. As such, the cleaning of the portable toilet is very time consuming and labor intensive. Also, the proper and constant cleaning of the interior components of the portable toilet is difficult to maintain.

Another disadvantage of prior art portable toilets is that the assembled portable toilets are bulky, thus only a few portable toilets can be transported at a time by a standard truck. Larger transport trucks are required to transports larger numbers of the portable toilets. The size, weight and bulk of the portable toilets require multiple individuals to move the portable toilets on and off of a transport vehicle. As such, the shipping, unloading and loading of the portable toilets are very labor intensive and typically require multiple individuals.

Another disadvantage associated with portable toilets is the difficulty associated with branding a portable toilet. Many public events (e.g., fairs, carnivals, outdoor craft shows, outdoor festivals, outdoor cooking events, etc.) that draw substantial numbers of people to a location that typically do not have sanitary facilities for large groups of people (e.g., parks, parking lots, street events, etc.) are sponsored by one or more companies or organizations. These events also typically require the use of portable toilets to accommodate the sanitary requirements of large groups of people at the event. Many sponsors seek branding of items at the event to promote the company or organization. The inclusion of advertising on the portable toilets generally is difficult or expensive. Custom painting or forming the portable toilet to include a brand name or symbol on the portable toilet is expensive and the portable toilet must forever be used with such brand. Banners or stickers can be applied to the portable toilet; however, such banners can be unsanitary or easily removed, and stickers can be difficult to remove thus defacing the portable toilet.

In view of the current state of the art of portable toilets, there is a need for an improved portable toilet that is easy to clean, transport, and which can be branded.

SUMMARY OF THE INVENTION

The present invention is directed to a portable toilet that includes one or more disposable components. The portable toilet is designed to be easy to clean, and easier and more convenient to transport than prior art portable toilets. In one non-limiting embodiment of the invention, the portable toilet is formed of disposable and reusable components. In one non-limiting arrangement, all or a portion of the side wall of the portable toilet is formed of one or more disposable components (e.g., paper board, cardboard, fiber board, press board, etc.). In one non-limiting design, all or a portion of the side wall of the portable toilet is formed of a paper board, cardboard material, press board, and/or fiberboard material. As can be appreciated, paper board, cardboard material, press board, and/or fiberboard material can include materials in addition to or other than cellulose materials (e.g., plastic material, starch, adhesives, composite materials, etc.); however, this is not required. The paper board, cardboard material, press board, and/or fiberboard material is designed to be disposable after use of the portable toilet. The paper board, cardboard material, press board and/or fiberboard material is generally formed or includes recycled materials; however, this is not required. The color and thickness of the paper board, cardboard material, press board and/or fiberboard material is non-limiting. One or more layers of paper board, cardboard material, press board, and/or fiberboard material can be used to form the side wall of the portable toilet. Generally, the total thickness of the one or more layers of paper board, cardboard material, press board and/or fiberboard material used to form the side wall of the portable toilet is least about 0.125 inches; however, thinner thicknesses can be used. Generally, the total thickness of the one or more layers of paper board, cardboard material, press board and/or fiberboard material used to form the side wall of the portable toilet is up to about 6 inches; however, greater thicknesses can be used. In one non-limiting configuration, the total thickness of the one or more layers of paper board, cardboard material, press board and/or fiberboard material used to form the side wall of the portable toilet is about 0.25-5 inches, typically the total thickness of the one or more layers of paper board, cardboard material, press board and/or fiberboard material used to form the side wall of the portable toilet is about 0.25-4 inches, more typically the total thickness of the one or more layers of paper board, cardboard material, press board and/or fiberboard material used to form the side wall of the portable toilet is about 0.5-4 inches, even more typically the total thickness of the one or more layers of paper board, cardboard material, press board and/or fiberboard material used to form the side wall of the portable toilet is about 0.5-3 inches, and still even more typically the total thickness of the one or more layers of paper board, cardboard material, press board and/or fiberboard material used to form the side wall of the portable toilet is about 0.5-2 inches. The use of a disposable paper board, cardboard material, press board and/or fiberboard material for all or a portion of the side wall of the portable toilet can result in the total weight of the portable toilet to be lighter than standard prior art portable toilets. Generally the portable toilet of the present invention is about 10%-50% lighter than prior art portable toilets of the same size, shape and configuration. In another and/or alternative non-limiting embodiment of the invention, the disposable material forms about 10%-100% of the side wall of the portable toilet. The disposable material used on the side wall of the portable toilet enables such material to be recycled or disposed of after use of the portable toilet, thus this portion of the portable toilet does not require cleaning after use. As such, the portable toilet of the present invention has less area to be cleaned after use, thus reducing the time and manpower required to clean the portable toilet of the present invention. In one non-limiting design, the disposable material forms about 25%-100% of the side wall of the portable toilet, typically the disposable material forms about 40%-100% of the side wall of the portable toilet, more typically the disposable material forms at least a majority of the side wall of the portable toilet, still more typically the disposable material forms about 60%-100% of the side wall of the portable toilet, and even more typically the disposable material forms about 75%-100% of the side wall of the portable toilet.

In one non-limiting aspect of the present invention, the portable toilet of the present invention includes a disposable side wall and modular non-disposable top and/or bottom sections. The disposable side wall is generally formed of a disposable material such as, but not limited to paper board, cardboard, corrugated paper board, fiber board, press board, and the like. Generally the disposable material is completely or partially formed of a cellulose material; however, this is not required. As can be appreciated, all or a portion of the side wall of the portable toilet can be formed of a disposable paper product. The top and/or bottom sections of the portable toilet are fully or partially formed of materials that are reusable and can generally be easily cleaned. Non-limiting examples of materials that are reusable and can generally be easily cleaned include plastic, composite materials, fiberglass, carbon fiber material, metal, and the like. In one non-limiting embodiment of the invention, the top section of the portable toilet is formed of a reusable material. In one non-limiting design, the top section is designed to facilitate in securing to the side wall of the portable toilet and maintain the shape of the side wall of the portable toilet; however, this is not required. In another and/or alternative non-limiting design, the top section can be designed to be easily connected to and/or removed from the side wall of the portable toilet so as to facilitate in easy assembly and/or disassembly of the portable toilet. In still another and/or alternative non-limiting design, the roof or ceiling that is formed by the top section can be formed of a reusable or a disposable material. In one non-limiting configuration, the roof or ceiling that is formed by the top section can be formed of a reusable material. In such a configuration, the top section can be a single piece of material (e.g., molded plastic material, etc.); however, this is not required. In another non-limiting configuration, the roof or ceiling that is formed by the top section can be formed of a disposable material. In such a configuration, the ceiling or roof can be formed of a cellulose material and/or cellulose containing material (e.g., paper board, cardboard, corrugated paper board, fiber board, press board, wood, etc.). The disposable material can be designed to be easily inserted and/or removed from the reusable portion of the top section for easy assembly and/or disassembly of the portable toilet; however, this is not required. The inclusion of disposable materials on the top section can be used to lighten the top section, reduce the time necessary to the clean the top section, and/or increase the ease to clean the top section; however, this is not required. The material used to form the disposable ceiling or roof can be the same or similar material and/or have the same or similar thickness as the material used to form the disposable side wall of the portable toilet; however, this is not required. In another non-limiting configuration, the top surface of the roof or ceiling that is formed by the top section can be formed into certain shapes that correspond to the theme of the portable toilet; however, this is not required. For example, if the portable toilet was shaped similarly to a can and included advertising that was associated with the look of a can (e.g., Coke™ can, Sprite™ can, Dr. Pepper™ can, Pepsi™ Can, Mountain Dew™ can. etc.), the top surface of the ceiling or roof can be designed to look similar to the top of such a can (e.g., include structures that look similar to the opening tab of the can, etc.); however, this is not required. In still yet another and/or alternative non-limiting design, the bottom section can be designed to be easily connected to and/or removed from the side wall of the portable toilet so as to facilitate in easy assembly and/or disassembly of the portable toilet. In another and/or alternative non-limiting design, the floor that is formed by the bottom section can be formed of a reusable or a disposable material. In one non-limiting configuration, the floor of the portable toilet that is formed by the bottom section can be formed of a reusable material. In such a configuration, the bottom section can be a single piece of material (e.g., molded plastic material, etc.); however, this is not required. In another non-limiting configuration, the floor that is formed by the bottom section can be formed of a disposable material. In such a configuration, the floor can be formed of a cellulose material and/or cellulose containing material (e.g., paper board, cardboard, corrugated paper board, fiber board, press board, wood, etc.). The disposable material can be designed to be easily inserted and/or removed from the reusable portion of the bottom section for easy assembly and/or disassembly of the portable toilet; however, this is not required. The inclusion of disposable materials on the bottom section can be used to lighten the bottom section, reduce the time necessary to the clear the bottom section, and/or increase the ease to clean the bottom section; however, this is not required. The material used to form the disposable floor can be the same or similar material and/or have the same of similar thickness as the material used to form the disposable side wall of the portable toilet; however, this is not required.

In another and/or alternative non-limiting aspect of the invention, the portable toilet includes a door system. The configuration of the door system is non-limiting. For purposes of the present invention, the door system is separate from the side wall of the portable toilet. In one non-limiting embodiment of the invention, the door system is formed of reusable materials. In another and/or alternative non-limiting embodiment of the invention, the door system includes or is fully formed of disposable materials. In still another and/or alternative non-limiting embodiment of the invention, the door system is connected to the top and/or bottom section of the portable toilet; however, this is not required. In yet another and/or alternative non-limiting embodiment of the invention, the door system includes a locking arrangement to enable a user in the portable toilet to lock and unlock the one or more doors on the door system; however, this is not required. In still yet another and/or alternative non-limiting embodiment of the invention, the door system includes a single door. In another and/or alternative non-limiting embodiment of the invention, the door system includes two doors. In still another and/or alternative non-limiting embodiment of the invention, one or more doors on the door system include a handle and/or grasping region to facilitate in the opening and/or closing of the one or more doors; however, this is not required. In yet another and/or alternative non-limiting embodiment of the invention, one or more doors on the door system are pivotally connected to a frame of the door system; however, this is not required. In still yet another and/or alternative non-limiting embodiment of the invention, the door system is connectable to the side wall of the portable toilet; however, this is not required.

In still another and/or alternative non-limiting aspect of the invention, the disposable side wall of the portable toilet includes one or more groove or slots that enable the side wall to be bent to the desired configuration during the assembly of the portable toilet. One of the importable advantages of the portable toilet of the present invention is the modular configuration of the portable toilet. Generally all or a portion of the bottom and top of the portable toilet is formed of a reusable material such as plastic. These pieces are generally shipped to a location and the portable toilet is assembled at a particular location which is generally where the portable toilet is to be used; however, this is not required. Likewise, the door system is generally shipped to a location and the portable toilet is assembled at a particular location which is generally where the portable toilet is to be used; however, this is not required. The door system is generally formed of a reusable material such as plastic; however, this is not required. Furthermore, the side wall of the portable toilet is generally shipped to a location and the portable toilet is assembled at a particular location which is generally where the portable toilet is to be used; however, this is not required. When the side wall is in the form of paper board, cardboard, corrugated paper board, fiber board, press board and the like, the side wall is generally shipped in the form of a flat or generally flat sheet for easy packaging, spacing saving, storage and transport. The modular design of the portable toilet results in easier packaging, space savings, storage and transport of the components of the portable toilet as compared to fully assembled prior art portable toilets. Once the side wall is delivered to a desired location, the flat side wall must be bent in certain regions so that the side wall can be fitted to the top section, bottom section and/or door system of the portable toilet during assembly of the portable toilet. In one non-limiting configuration, the side wall is formed of one or more sections, wherein at least one of the sections includes a groove or slot that facilitates in the bending of the side wall to conform with the shape of at least a portion of the outer surface of the portable toilet. In another non-limiting configuration, the side wall is formed of one piece and the side wall includes a plurality of grooves or slots to facilitate in the bending of the side wall to conform to the shape of the outer side wall of the portable toilet. In this non-limiting configuration, the side wall generally includes 3-10 grooves or slots so that the one piece side wall can be bent at 3-10 locations, typically includes 3-8 grooves or slots so that the one piece side wall can be bent at 3-8 locations, more typically includes 3-6 grooves or slots so that the one piece side wall can be bent at 3-7 locations. As can be appreciated, the side wall can include more than 10 grooves or slots.

In yet another and/or alternative non-limiting aspect of the invention, the disposable side wall can include printed advertising, designs and/or literature on the inner and/or outer surface of the disposable side wall; however, this is not required. In one non-limiting embodiment of the invention, the outside surface of the side wall can include sponsorship information regarding event sponsors, companies sponsoring the portable toilets, etc. In another and/or additional non-limiting embodiment of the invention, the outside surface of the side wall can include printed designs and/or information, etc. to make the outside of the portable toilet look similar to a product (e.g., beverage can [e.g., Red Bull™ can, Coke™ can, Pepsi™ can, Miller™ can, Budweiser™ can, etc.], beverage bottle [Coke™ bottle, Pierre™ bottle, etc.], beverage container [e.g., Gatorade™, 5-Hour Energy™ bottle, etc.], oil can [Mobil Oil™ can, Pennzoil™ can, etc.], non-beverage container [e.g., Comet™ can, Turtle Wax™ can, etc.], sponsorship information regarding event sponsors, companies sponsoring the portable toilets, etc. In still another and/or additional non-limiting embodiment of the invention, the inside surface of the side wall can include printed designs and/or information (e.g., sponsorship information, information on use of the portable toilet, safety information, emergency information, etc.), etc.; however, this is not required.

In still yet another and/or alternative non-limiting aspect of the invention, the top and/or bottom section of the portable toilet can include a configuration that facilitates in creating an overall look of the portable toilet regarding a product configuration. For example, when the outside side wall of the portable toilet includes printing to make the portable toilet look like a product (e.g., Coke can, etc.), the top and/or bottom sections of the portable toilet can also be designed to include one or more features of the product (e.g., top section includes features that look like the can tab for a Coke can, top section includes a rim that looks like the top rim of a Coke can, top section includes a curved profile that looks like the curved profile of the top of a Coke can, bottom section includes a curved profile that looks like the curved profile of the bottom of a Coke can, etc.); however, this is not required.

In another and/or alternative non-limiting aspect of the invention, the top section, bottom section and/or side wall of the portable toilet can include one or more vents or vent openings; however, this is not required.

In still another and/or alternative non-limiting aspect of the invention, the interior of the portable toilet can include one or more features (e.g., sink, toilet paper dispenser, faucet, urinal, toilet, mirror, shelf, handle, toilet seat, toilet lid, refuse receptacle, fan, light, pump, etc.).

In yet another and/or alternative non-limiting aspect of the invention, the top and bottom sections can be designed to be stacked together for easy transport; however, this is not required. In one non-limiting embodiment, sets of stacked top and bottom sections can be stacked together for easy transport; however, this is not required.

In still yet another and/or alternative non-limiting aspect of the invention, the toilet system that is used on the interior of the portable toilet can be foldable for compact shipping; however, this is not required. In one non-limiting embodiment, the toilet system is foldable such that can be positioned between two stacked top and bottom sections for easy transport and storage; however, this is not required.

In another and/or alternative non-limiting aspect of the invention, the side wall includes one or more mounting slots that are used to secure the toilet system to the side wall of the portable toilet; however, this is not required.

In still another and/or alternative non-limiting aspect of the invention, a removable disposable waste pouch is positioned in the toilet of the toilet system to collect waste deposited in the toilet; however, this is not required. The removable disposable waste pouch can be substituted for a standard waste tank that is commonly used in a portable toilet. The use of the removable disposable waste pouch is designed to save space, reduce the weight of the portable toilet, make the transport of the portable toilet components simpler, make the disposal of waste simpler, and/or make the assembly of the portable toilet simpler; however, this is not required.

In use, the top section, bottom section, door assembly, and internal components of the portable toilet (e.g., urinal, toilet structure, toilet seat, etc.) are shipped to an event location in unassembled form. Since these components are unassembled, more of these components can be shipped in the same space than if the portable toilet had been preassembled. The side wall can also be shipped with the reusable components of the portable toilet or shipped separately. Generally the side wall is not pre-bent, but may be pre-creased so that the side wall, during assembly of the portable toilet, can be more easily formed into shape; however, this is not required. The unassembled portable toilet takes up less space than traditional preassembled toilets; thus the portable toilets of the present invention are easier to store, and takes up less space during storage and transport. The portable toilets of the present invention are also generally lighter than traditional portable toilets. The portable toilets of the present invention are to be designed for easy assembly at an event site, and can be easily disassembled after the event is completed. The side wall is designed to be disposed of after the portable toilet is disassembled, thus reducing cleanup time of the other reusable components of the portable toilet. The reusable components are generally formed of durable materials (e.g., plastic materials, etc.) that can be easily cleaned and then reshipped to another event and/or stored for later use. The disposable side wall is generally made of recyclable material so that the side can be disposed of in an environmentally friendly manner. When the portable toilet is to be used for different venues and/or events, the side walls can include printed materials to reflect a certain sponsorship and/or event. The top section of the portable toilet can optionally be designed for simple modification to complement a theme of the portable toilet; however, this is not required.

It is one non-limiting object of the present invention to provide an improved portable toilet.

It is another and/or alternative non-limiting object of the present invention to provide a portable toilet that is lighter than prior art portable toilets.

It is still another and/or alternative non-limiting object of the present invention to provide a portable toilet that includes a recyclable side wall and a reusable top and bottom section.

It is yet another and/or alternative non-limiting object of the present invention to provide a portable toilet that can be transported in a disassembled form and be easily assembled on site.

It is still yet another and/or alternative non-limiting object of the present invention to provide a portable toilet that includes printed material on the disposable side wall.

It is another and/or alternative non-limiting object of the present invention to provide a portable toilet that can easily include a variety of sponsorship information on the side wall of the portable toilets.

It is still another and/or alternative non-limiting object of the present invention to provide a portable toilet that can be made to look like a product can and has a disposable side wall that can include printed material to facilitate in making the portable toilet look like an enlarged version of a particular product.

It is yet another and/or alternative non-limiting object of the present invention to provide a portable toilet that has top and bottom sections that can be designed to be stacked together for easy transport and/or easy and convenient storage.

It is still yet another and/or alternative non-limiting object of the present invention to provide a portable toilet that has sets of stacked top and bottom sections that can be stacked together for easy transport and/or easy and convenient storage.

It is another and/or alternative non-limiting object of the present invention to provide a portable toilet system that is used on the interior of the portable toilet that can be foldable for compact shipping and/or easy and convenient storage.

It is still another and/or alternative non-limiting object of the present invention to provide a portable toilet system that is foldable such that it can be positioned between two stacked top and bottom sections for easy transport and/or easy and convenient storage.

It is still yet another and/or alternative non-limiting object of the present invention to provide a portable toilet that has a side wall that includes one or more mounting slots that are used to secure the toilet system to the side wall of the portable toilet.

It is another and/or alternative non-limiting object of the present invention to provide a portable toilet that has a removable disposable waste pouch that is positioned in the toilet of the toilet system to collect waste deposited in the toilet.

These and other objects and advantages will become apparent to those skilled in the art upon reading and following the description taken together with the accompanying drawings.

BRIEF DESCRIPTION OF THE DRAWINGS

Reference may now be made to the drawings which illustrate various preferred embodiments that the invention may take in physical form and in certain parts and arrangement of parts wherein:

FIG. 1 is a front plan view of one non-limiting configuration of the portable toilet of the present invention;

FIG. 2 is a side plan view of the portable toilet of FIG. 1;

FIG. 3 is a cross-section view along line 3-3 of FIG. 1;

FIG. 5 is a front elevation view of the portable toilet of FIG. 1;

FIG. 6 is an exploded view of the portable toilet of FIG. 1;

FIG. 7 is a front elevation view of the portable toilet of FIG. 1 absent the side wall and door system, FIG. 8 is a top plan view of the portable toilet of FIG. 1;

FIG. 9 is a bottom plan view of the portable toilet of FIG. 1;

FIG. 13 is a top plan view of one non-limiting side wall in the unfolded configuration;

FIG. 14 is a front elevation view of a plurality of stacked side walls in the unfolded configuration;

FIG. 15 is an enlarged top view of a portion of the door system;

FIGS. 24-27 are various folded and unfolded views of the disposable refuse receptacle;

DETAILED DESCRIPTION OF NON-LIMITING EMBODIMENTS

Figure 4:
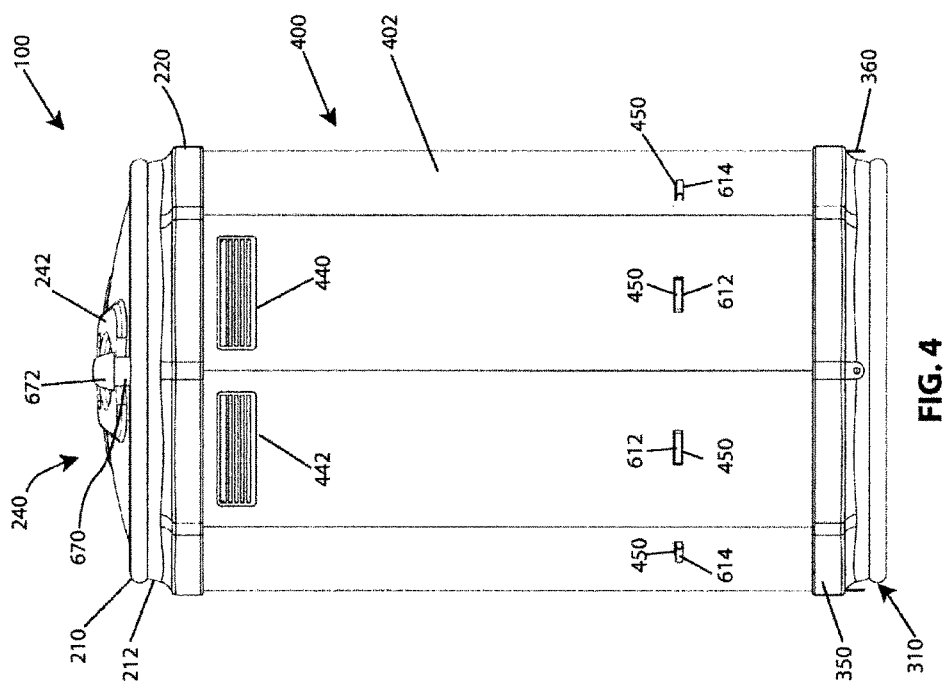
FIG. 4 is a rear plan view of the portable toilet of FIG. 1.

Referring now to the drawings wherein the showings are for the purpose of illustrating one non-limiting embodiment of the invention only and not for the purpose of limiting same, FIGS. 1-27 illustrate one non-limiting embodiment of the portable toilet in accordance with the present invention. Referring to FIGS. 1-6, a non-limiting shape of the portable toilet 100 of the present invention is illustrated. The portable toilet is illustrated as having eight (8) sides and one of the sides includes a door system for the portable toilet; however, this is not required. The sides of the portable toilet are illustrated as generally the same width, thus forming a generally octagon shape; however, this is not required. As can be appreciated, the portable toilet can have a greater or lesser number of sides (e.g., 3 sides, 4 sides, 5 sides, 6 sides, 7 sides, 9 sides, 10 sides, etc.); however, this is not required. As can also be appreciated, one or more of the sides can have a larger or smaller width than one or more other sides of the portable toilet; however, this is not required. As such, the shape of the outer shape of the portable toilet of the present invention is non-limiting. The height of the portable toilet is also non-limiting. Generally the height of the portable toilet in the fully assembled form is about 5-9 feet; however, other heights can be used. The maximum cross-sectional area of the portable toilet in the fully assembled form (e.g., foot print of the portable toilet) is non-limiting. Generally, the maximum cross-sectional area of the portable toilet in the fully assembled form is about 10-40 square feet, typically about 12-30 square feet, more typically about 15-25 square feet, and even more typically about 16-22 square feet; however, other maximum cross-sectional areas can be used. In one non-limiting configuration, the maximum cross-sectional area of the portable toilet in the fully assembled form is about 19-20 square feet. The maximum cross-sectional width of the portable toilet in the fully assembled form is non-limiting. Generally, the maximum cross-sectional width of the portable toilet in the fully assembled form is about 3-8 feet, typically about 3-6 feet, and more typically about 3.5-6 feet; however, other maximum cross-sectional widths can be used. In one non-limiting configuration, the maximum cross-sectional width of the portable toilet in the fully assembled form is about 4-5 feet. As illustrated in FIG. 6, the portable toilet 100 includes a top section 200, a bottom section 300, a side wall 400, a door system 500 and a toilet system 600.

The top section of the portable toilet can have any number of configurations, shapes and sizes. As illustrated in FIG. 6, the top section is a two-piece unit; however, it can be appreciated that the top section can be a single piece unit or be formed of more than two pieces. The lower portion 210 of the top section has a generally circular cross-sectional shape; however, the lower portion 210 can have other cross-sectional shapes (e.g., square, rectangular, oval, polygonal, etc.). The lower portion includes a side wall flange 220 that can fully or partially encircle the body 212 of the lower portion of the top section. As will be described in more detail below, the side wall flange is designed to fit about a top region of the side wall when the lower portion of the top section is positioned on the top edge of the side wall. The side wall flange includes an inner surface 222 that is designed to engage the side wall; however, this is not required. The inner surface of the side wall flange can have a continuous arcuate surface or be formed of a plurality of straight or arcuate sections. As illustrated in FIG. 6, the inner surface of the side wall flange is formed of a plurality of straight or arcuate sections 222*a*. The number of straight or arcuate sections 222*a* generally is the same as the number of sides of the portable toilet; however, this is not required. As illustrated in FIGS. 1-6, the portable toilet includes eight (8) sides. As such, the number of straight or arcuate sections 222*a* of the side wall flange for the top section illustrated in FIGS. 1-6 is eight (8). Also, the length of the straight or arcuate sections is generally the same as the length of a corresponding side wall section. As can be appreciated, the configuration of the inner surface of the side wall flange can be used to properly orient the top section on the side wall; however, this is not required. The body 212 of the lower portion can include a bottom landing 214 that is designed to engage the top edge of the side wall when the top section is placed on the side wall; however, this is not required. The bottom landing extends inwardly from the inner surface of the side wall flange. A wall slot, not shown, can be optionally used to receive a portion of the top edge of the side wall when the top section is fitted on the side wall; however, this is not required. When a wall slot is used, the inner surface of the side wall flange can form one side of the wall slot; however, this is not required.

The top rim 216 of the bottom portion is illustrated as positioned inwardly of the outer surface of the side wall flange; however, this is not required. The configuration of the top rim is non-limiting. Indeed, the inclusion of the top rim is optional. As illustrated in FIG. 1-6, the portable toilet is illustrated as looking similar to a beverage can. As such, the top rim is designed to look similar to the top of a beverage can or some other type of product container. Essentially, the top rim is used to create a certain look for the top section. Therefore, if the top section is to have a flat surface, the top rim on body 212 of the lower portion could be eliminated; however, this is not required.

The body 212 of the lower portion includes a vent tube opening 218 that is used to receive a support portion of a vent tube that is part of the toilet system. As can be appreciated, if the toilet system does not include a vent tube, or the vent tube is directed through the bottom section or the side wall instead of the top section, then the vent tube opening in the lower portion can be eliminated. As can also be appreciated, a vent tube opening can alternatively be positioned in the upper portion 240 of the top section; however, this is not required.

The side wall flange 220 on the lower portion of the top section can optionally include a door frame recess 230 that is designed to receive a top portion of the door system. The size, shape and configuration of the door frame recess are non-limiting.

The upper portion 240 is illustrated as removably connected to the lower portion of the top section. As can be appreciated, the upper portion can be irremovably connected to the lower portion or be integrally formed with the lower portion; however, this is not required. The upper portion has a shape that is similar to the pull top portion 242 of a beverage can. This configuration of the upper portion is used to facilitate in the overall look of the portable toilet. As such, when the outer surface of the portable toilet is to look similar to a beverage can, the pull top shape on the upper portion can be used to facilitate in the overall beverage can look of the portable toilet. When the upper portion of the top section is removable, different shaped upper portions can be connected to the lower portion to create different overall appearances of the portable toilet. As such, different upper portion configurations can be used for different themes for the portable toilet (e.g., beverage bottle top, WD-40 can top, etc.); however, this is not required. The color of the top section can also be selected to match color schemes of products; however, this is not required. The manner in which the upper portion is connected to the lower portion is non-limiting (e.g., melted seam, adhesive, hook and loop fasteners, snap connections, etc.). The upper portion can include a vent tube recess 244 to be fitted about a portion of the vent tube of the toilet system; however, this is not required. The bottom portion of the top section can optionally include a landing 217 to receive a lower surface of the upper portion. As illustrated in FIG. 6, the landing 217 is positioned on rim 216; however, this is not required.

Figure 10:
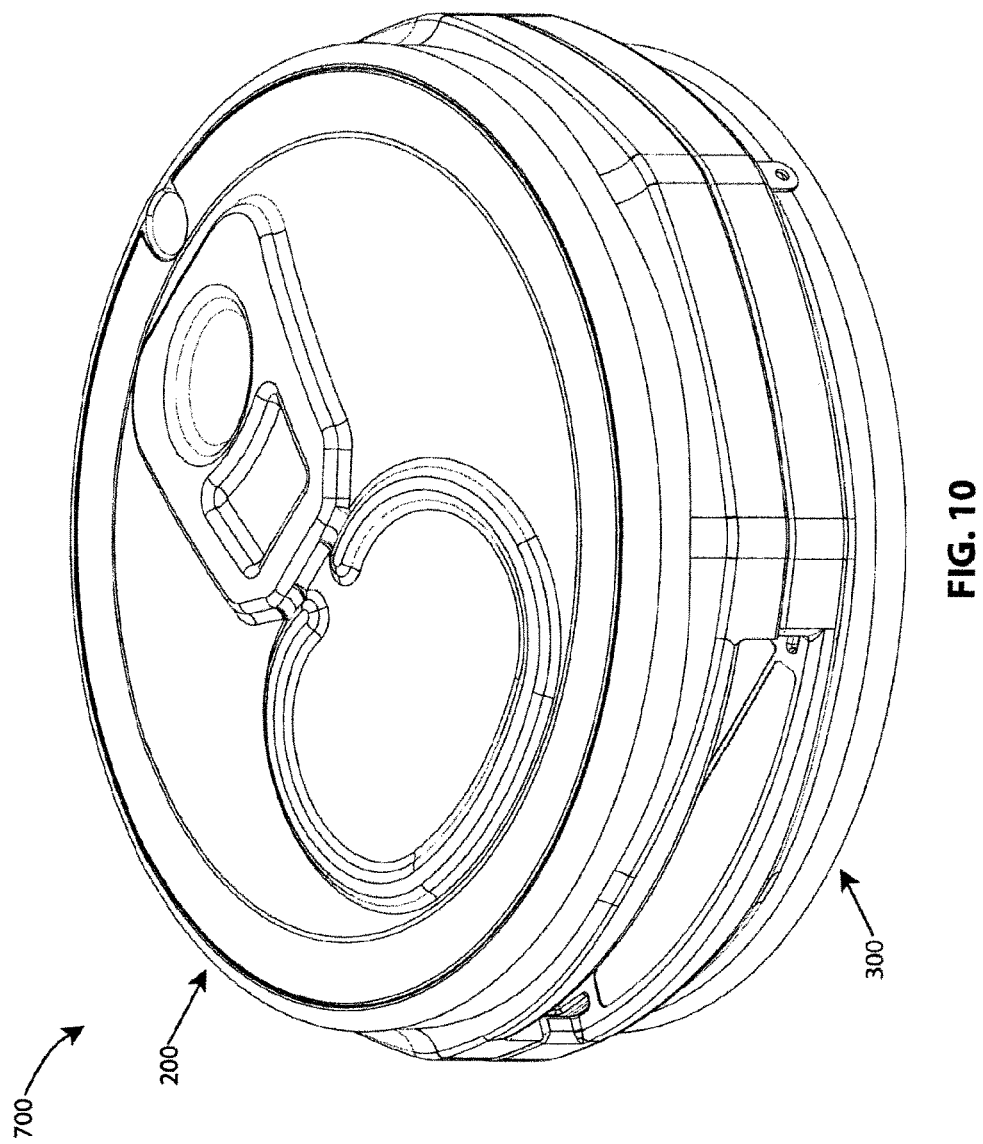
FIG. 10 is a front elevation view of the top and bottom sections of the portable toilet of FIG. 1 in a stacked arrangement.
Figure 11:
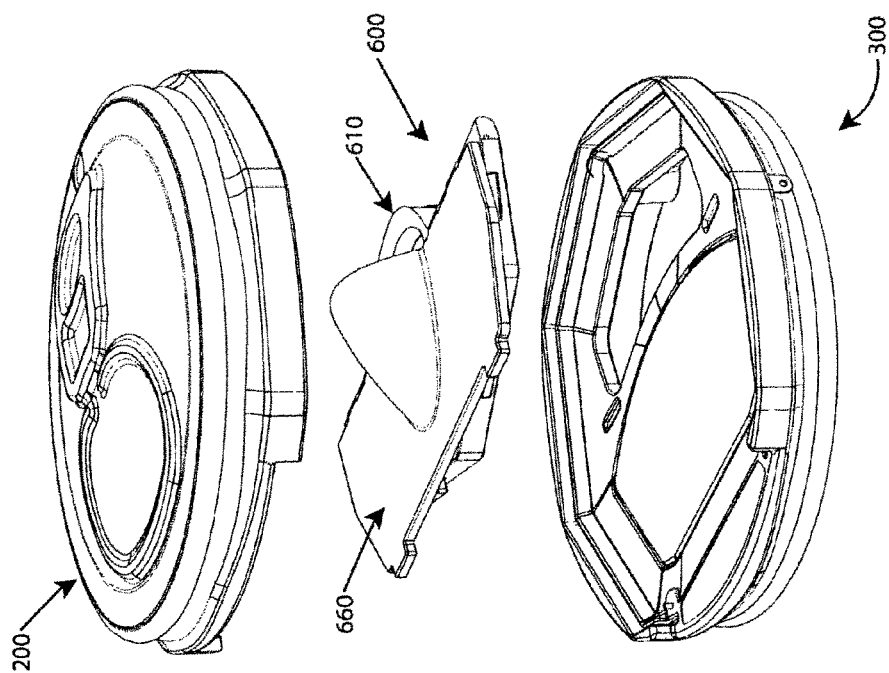
FIG. 11 is an exploded view of FIG. 10 and illustrating a collapsible toilet system that can be positioned between the top and bottom sections of the portable toilet when in the stacked arrangement of FIG. 10.

The bottom section 300 can have an outer profile that is the same or similar to the outer profile of the top section as illustrated in FIGS. 6 and 10-12; however, this is not required. The bottom section includes a base portion 310 and a side wall flange 350. The base portion has a generally circular cross-sectional shape; however, the base portion can have other cross-sectional shapes (e.g., square, rectangular, oval, polygonal, etc.). The side wall flange 350 can fully or partially encircle the base portion. As will be described in more detail below, the side wall flange is designed to fit about a bottom region of the side wall when the bottom edge of the side wall 400 is positioned on the bottom section. The side wall flange includes an inner surface 352 that is designed to engage the side wall; however, this is not required. The inner surface of the side wall flange can have a continuous arcuate surface or be formed of a plurality of straight or arcuate sections. As illustrated in FIG. 6, the inner surface of the side wall flange is formed of a plurality of straight or arcuate sections 352a. The number of straight or arcuate sections generally is the same of the number of sides of the portable toilet; however, this is not required. As illustrated in FIGS. 1-6, the portable toilet includes eight (8) sides. As such, the number of straight or arcuate sections 352a of the side wall flange for the bottom section illustrated in FIGS. 1-6 is six (6) longer sides and two (2) shorter sides that are used in conjunction with the door system. Also, the length of the straight or arcuate sections is generally the same as the length of a corresponding side wall section. As can be appreciated, the configuration of the inner surface of the side wall flange can be used to properly orient the side wall on the bottom section; however, this is not required. The base portion 310 can include a bottom landing 312 that is designed to engage the bottom edge of the side wall when the side wall is placed on the bottom section; however, this is not required. The bottom landing extends inwardly from the inner surface of the side wall flange 352 as illustrated in FIGS. 6 and 11. A wall slot, not shown, can be optionally used to receive a portion of the bottom edge of the side wall when the side wall is fitted or positioned on the bottom section; however, this is not required. When a wall slot is used, the inner surface of the side wall flange can form one side of the wall slot; however, this is not required.

The bottom portion can optionally include mounting tabs 360 that can be used to secure the bottom section to a ground surface. The number of mounting tabs on the bottom portion, the size/shape/configuration of the mounting tabs, and the location of the mounting tabs on the bottom portion is non-limiting. As illustrated in FIG. 6, the mounting tabs have an opening 362; however, this is not required.

The configuration of the outer surface of the bottom portion is non-limiting. As illustrated in FIG. 1-6, the portable toilet is illustrated as looking similar to a beverage can. As such, the outer surface of the bottom portion is designed to look similar to the bottom of a beverage can or some other type of product container. Essentially, the outer surface of the bottom portion, similar to the outer surfaces of the top section, is used to create a certain look for the portable toilet.

The base portion 310 can optionally include a vent tube opening 320 that is used to receive one end of a vent tube that is part of the toilet system. As can be appreciated, if the toilet system does not include a vent tube, or the vent tube is directed through the side wall instead of the base portion, then the vent tube opening in the base portion can be eliminated.

The base portion can optionally include a door frame recess 330 that is designed to receive a bottom portion of the door system. The size, shape and configuration of the door frame recess are non-limiting.

The base portion can optionally include several structures. One non-limiting structure is a door mount flange 332 and a door pin 334 that are designed to engage a lower portion of the door system. The door mount flange 332 and a door pin 334, when used, can be of any configuration. The door mount flange 332 and a door pin 334, when used, are designed to facilitate in positioning the door frame system on the base portion and/or secure the door system to the base portions; however, this is not required.

The base portion can include one or more drainage grooves 336 to facilitate in draining liquid off of the base portion. As illustrated in FIG. 9, one or more drain slots 338 enable fluid in the drainage groove to exit the base portion and onto a ground surface. Generally, the one or more drain slots, when used, are positioned on the bottom of the drainage grooves; however, this is not required.

As illustrated in FIG. 9, the base portion can include one or more reinforcement structures 340. The size, shape, number and configuration of the reinforcement structures 340 are non-limiting. The reinforcement structures are designed to provide strength, support and/or rigidity to one or more portions of the base portion. As illustrated in FIG. 9, the reinforcement structures are in the form of conical structures that extend upwardly from the bottom surface of the base portion; however, this is not required. As illustrated in FIG. 3, the base portion includes a bottom recess 314; however, this is not required. The bottom recess, when included on the base portion, results in the central region of the base portion to be elevated from a ground surface when the base portion is positioned on a ground surface. Such elevated region can facilitate in the drainage of fluid through drain slots 338; however, this is not required.

The base portion can include one or more toilet system connection arrangements 342; however, this is not required. The size, shape, number and configuration of the toilet system connection arrangements are non-limiting. As illustrated in FIG. 9, two toilet system connection arrangements in the form of oval slots are illustrated on the top surface of the base portion. The base portion can also include a toilet system opening 344. The size, shape, materials, and configuration of the toilet system opening are non-limiting. The toilet system opening, when used, can have one or more uses, namely 1) provide ventilation into/out of the interior of the portable toilet, 2) enable liquids to drain from the base portion and/or toilet system, 3) reduce the weight/materials of the bottom section, and/or 4) enable one or more structures of the toilet system to be partially or fully positioned in the toilet system opening. As can be appreciated, the toilet system opening can have other or additional uses.

Referring now to FIGS. 6, 13 and 14, the side wall 400 of the portable toilet is generally formed of a bendable or otherwise formable material. Generally, the side wall is formed of a recyclable material that allows the side wall to be simply disposed of during the cleaning of the portable toilet; however, this is not required. In one non-limiting arrangement, the side wall is formed of paper board, cardboard material, press board or fiberboard material that includes a cellulose material; however, this is not required. The size, thickness, height, weight, materials, and configuration of the side wall are non-limiting. In one non-limiting configuration, the average thickness of the side wall is about 0.1-3 inches, typically 0.1-2 inches, more typically about 0.2-1 inches, and even more typically about 0.25-1 inches; however, other thicknesses can be used. In another and/or alternative non-limiting configuration, the maximum width or height of the side wall is generally about 3-10 feet, typically 4-8 feet, and more typically about 5-7 feet. In another and/or alternative non-limiting configuration, the maximum length of the side wall is generally about 8-20 feet, typically 10-16 feet, and more typically about 10-14 feet. As illustrated in FIG. 13, the side wall in the non-folded, flat configuration has a generally rectangular configuration. The height of the side wall in this particular non-limiting configuration is about 5.5-7 feet, the thickness of the side wall is about 0.3-0.9 inches, and the length of the side wall is about 11-13 feet.

The front face 410 and/or the back face 420 can include various types of information and/or designs A. The type or color of information and/or the design on the side wall are non-limiting. For example, if a beverage company such as The Coca-Cola Company was sponsoring an event and/or the portable toilets at an event, the front surface of the side wall could be printed to look like a product of The Coca-Cola Company (e.g., Coke can, Diet Coke can, A&W can, Squirt can, Dr. Pepper can, Minute Maid can, PowerAde bottle, etc) Likewise the bottom section and/or top section can be configured, colored, etc. to facilitate in the look of the product of The Coca-Cola Company so as to make the portable toilet better represent the product of the sponsor. The side wall can be simply preprinted prior to shipping to an event; however, it can be appreciated that some or all of the information and/or designs can be applied to the side wall at the event. The flat form or configuration of the side wall facilitates in the ease and convenience of storing and shipping one or more side walls to a particular location. As illustrated in FIG. 14, a plurality of side walls can be stacked together for transport; however, this is not required. As can be appreciated, the side wall can be manufactured and optionally have printing applied at some manufacturing location and the side wall can be shipped to an event location independently of the manner in which the top and/or bottom section is shipped to a particular location. As can also be appreciated, an even location could retain one or more sets of top and bottom sections of the portable toilet and merely order more side walls from a vendor or manufacturer for particular events, and optionally have customized printing applied to the side wall for different events; however, this is not required.

The side wall generally includes scoring 430 to facilitate in the bending of the side wall for connection to the top and bottom section when the portable toilet is assembled; however, this is not required. The scoring can be in the form of slots, grooves and the like. As illustrated in FIGS. 13 and 14, the side wall includes seven regions of scoring; however, other amounts of scoring can be used. The scoring is illustrated as extending the full or substantially the full width of the side wall; however, this is not required. As illustrated in FIG. 6, the side wall is bent at each region of scoring on the side wall. The scoring pattern on the side wall illustrated in FIG. 13 is designed to create six (6) sides 402 having generally the same width and two narrower width sides 404 at each end of the side wall. The two narrower width portions of the side wall are designed to be positioned next to or connect to the door system. As can be appreciated, many other scoring patterns can be used on the side wall to enable the side wall to be bent and configured for use in the portable toilet.

The side wall can optionally include one or more vent openings 440. The vent opening can be designed to receive vent grills or covers 442; however, this is not required. Indeed, the one or more vent openings can be cut and/or configured such that vent covers or grills are not required. The size, shape, configuration and location of the one or more vent openings on the side wall are non-limiting. The side wall can optionally include one or more connection slots 450 that can be used to secure one or more components of the toilet system to the side wall; however, this is not required. The size, shape, configuration and location of the one or more connection slots on the side wall are non-limiting.

Figure 16:
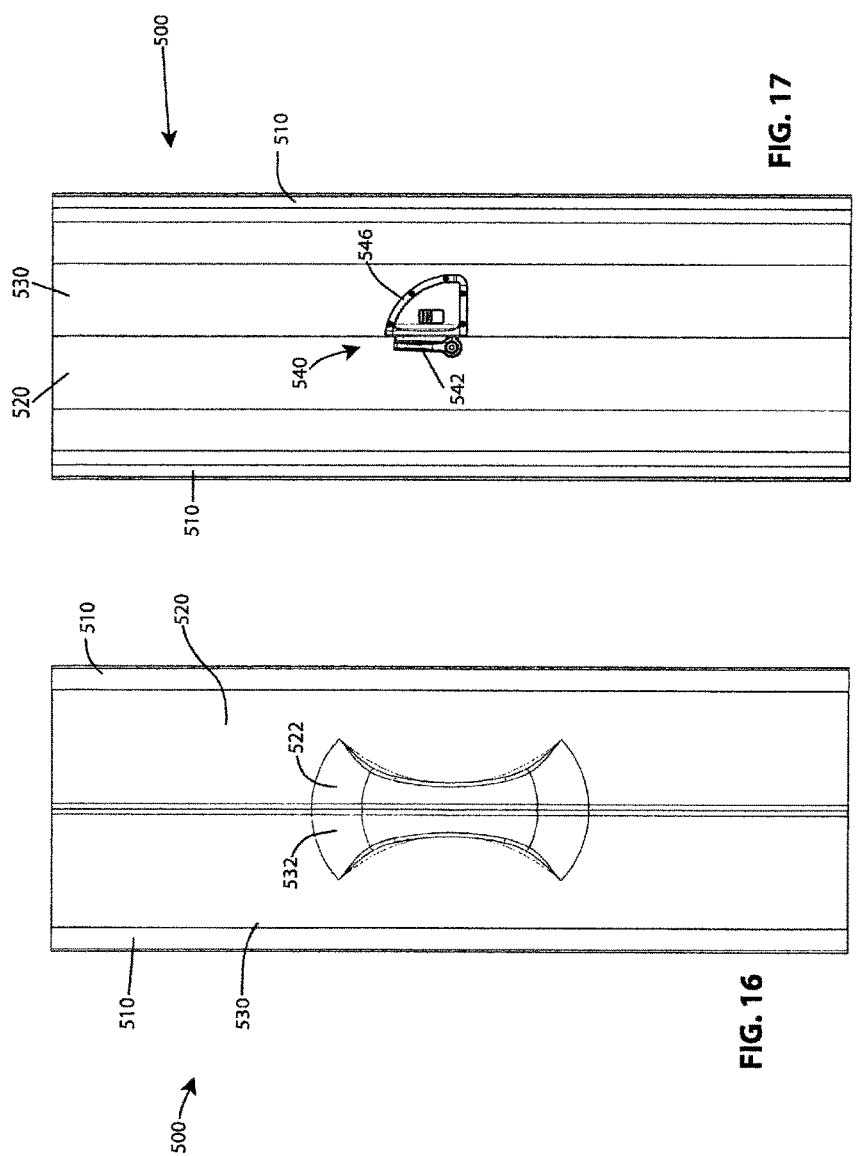
FIG. 16 is a front plan view of the door system.

Referring now to FIGS. 6 and 15-20, one non-limiting door system 500 that can be used in the portable toilet is illustrated. The size, shape, configuration, color and materials of the door system are non-limiting. The door system is illustrated as including a door frame 510 and two doors 520, 530 that are hingeably or pivotally connected to the door frame. The size, shape, height, thickness, materials, and configuration of the two doors are non-limiting. As illustrated in FIG. 16, the two doors have generally the same shape, size and configuration; however, this is not required. The door frame is illustrated as having two doors; however, it can be appreciated that the door system can include a single door or more than two doors. Each door includes a handle 522, 532 to enable a user to pull open the doors. The size, shape, height, thickness, color, materials, and configuration of each handle are non-limiting. As illustrated in FIG. 16, the two handles have generally the same shape, size and configuration; however, this is not required. As illustrated in FIG. 1, each of the doors plus one of narrower width sides 404 of the side wall form one side of the portable toilet. As such, the two doors of the door system plus the two narrower width sides 404 of the side wall form two sides of the portable toilet and the six sides 402 of the side wall form the other six sides of the portable toilet for a total of eight sides of the portable toilet. As can be appreciated, the side wall and/or the door system can be configured to create less than eight sides or more than eight sides for the portable toilet.

Figure 17:
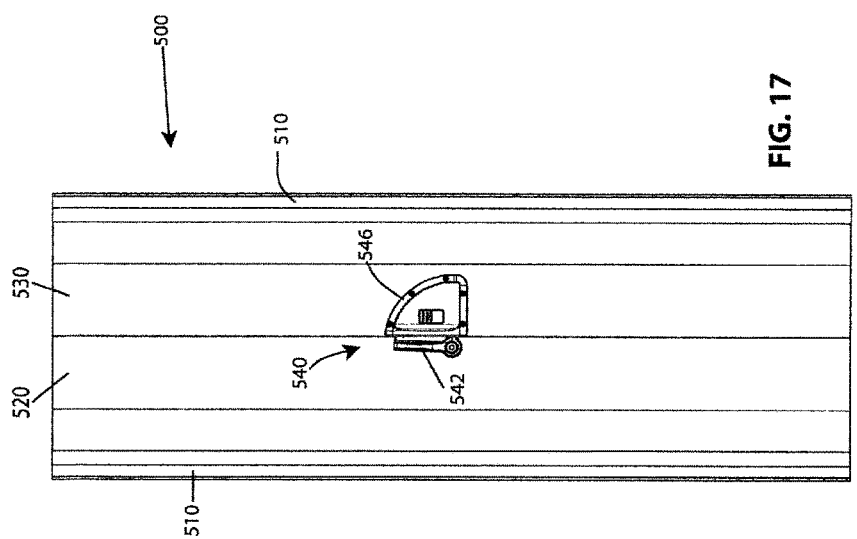
FIG. 17 is a rear plan view of the door system.
Figure 19:
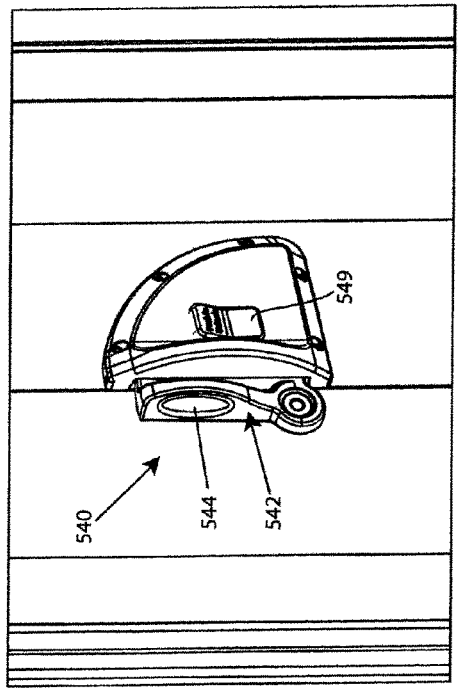
FIG. 19 is an enlarged front elevation view of a lock system for the door system in the locked position.
Figure 20:
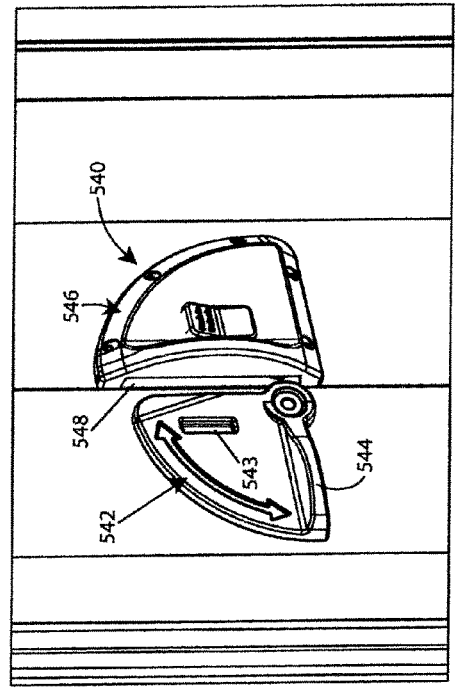
FIG. 20 is an enlarged front elevation view of a lock system for the door system in the unlocked position.

The inner surface of the two doors includes a door lock arrangement 540. The size, shape, color, materials, and configuration of the door lock arrangement, when used, are non-limiting. As illustrated in FIGS. 17, 19 and 20, the door lock arrangement includes a pivoting latch section 542 that is mounted to one of the doors and is designed to pivot between a locked and unlocked position. FIG. 19 illustrates the pivoting latch section in the locked position and FIG. 20 illustrates the pivoting latch section in the unlocked position. The pivoting latch section can include a grasping portion 544 to enable a user to easily and conveniently grasp the pivoting latch section and move the pivoting latch section as indicated by the arrow on the pivoting latch section; however, this is not required. The door lock arrangement also includes lock housing 546 mounted to the other door. The lock housing includes a slot or forms a slot 548 with the inner surface of the door that is designed to receive a portion of the pivoting latch section 542. The lock housing can include a lock release tab 549 that engages and/or interacts with a tab or slot 543 on the pivoting latch section; however, this is not required. The door lock arrangement can be connected to the door in any manner (e.g., adhesive, rivet, screw, bolt, snap connection, etc.).

Figure 18:
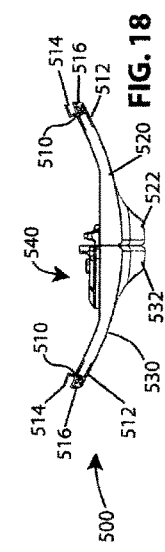
FIG. 18 is a top plan view of the door system.

Referring to FIGS. 15 and 18, the frame 510 of the door system includes a door cavity 512 that is designed to receive a side portion of a door and to secure the door to the door frame. The connection between the door frame and the door can be any type of connection (e.g., friction connection, adhesive connection, rivet connection, screw or bolt connection, snap fit connection, etc.). The end of the door is illustrated in FIG. 15 to have a narrower thickness for fitting into the door cavity; however, this is not required. As can be appreciated, the door can be connected to the door frame in other or alternative ways. The frame 510 of the door system also includes a wall cavity 514 that is designed to receive a narrower width side 404 of the side wall. The connection between the door frame and the side wall can be any type of connection (e.g., friction connection, adhesive connection, rivet connection, screw or bolt connection, snap fit connection, etc.). As can be appreciated, the side wall can be connected to the door frame in other or alternative ways. As also can be appreciated, the side wall does not need to be connected to the door system.

The door frame can optionally include a pivot or hinge mechanism 516 that enables one portion of the door frame to move relative to another portion of the door frame. The configuration of the pivot or hinge mechanism is non-limiting. As illustrated in FIG. 15, the pivot or hinge mechanism enables each door to swing between an open and closed position.

The configuration of the portable toilet as described above revolutionizes 1) the way in which a portable toilet can be shipped to a particular location, 2) the manner in which the portable toilet can be stored, 3) the manner in which the portable toilet can be assembled and disassembled, 4) the manner in which the portable toilet can be cleaned, and 5) the ability of the portable toilet to be customized for various events.

A portion or all of the top section and base section are generally formed of reusable materials such as a plastic material. The door system is also partially or fully formed of reusable materials. As such, the top section and bottom section of the portable toilet can be assembled and disassemble for a plurality of uses. After each use, the top and bottom section are generally cleaned and stored for later use or cleaned and transported to another location. The individualized top and bottom sections make such sections easier to clean due to the relatively light weight of each section and the ability to move and orient the section for cleaning when the section is not connected to the side wall and/or door system. Prior art portable toilets are not designed to be easily disassembled, thus are cleaned and transported in the fully assembled form. As such, it is more difficult to clean all of the surfaces of prior art portable toilets and more difficult to access and clean all of the regions of the fully assembled prior art portable toilets. The ability to easily disassemble the portable toilet of the present invention into small components results in easier cleaning of such components.

Figure 12:
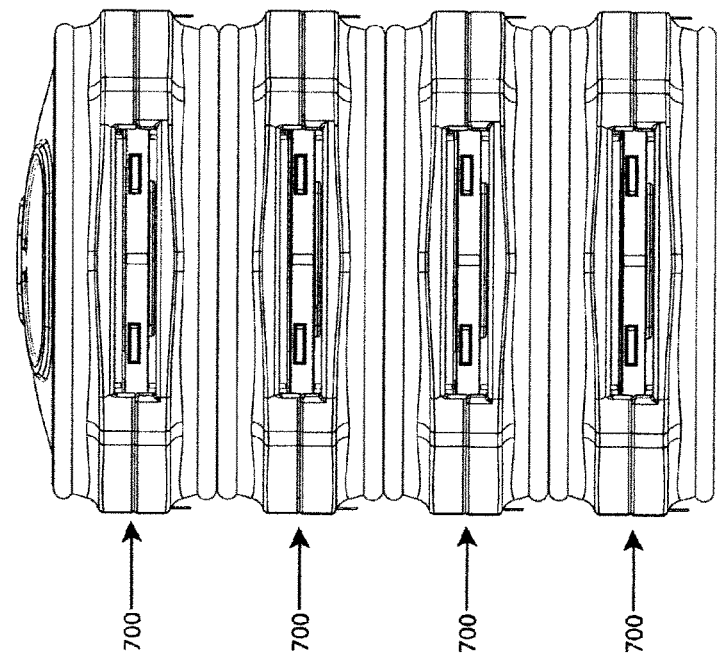
FIG. 12 illustrates a plurality of top and bottom sections in the stacked arrangement of FIG. 10 that are stacked on top of one another.

As illustrated in FIGS. 10 and 12, the top and bottom sections can be stacked together for easy transport and storage to form a stacked set 700 of a top and bottom section. The bottom edges of flange 220 on the top section can rest on the top edge of flange 350 on the bottom section as illustrated in FIG. 10 to facilitate in the stacking of a set of top and bottom portions. As illustrated in FIG. 12, the bottom of the bottom section can sit on the top of the section of another set of top and bottom portions so that a plurality of sets of top and bottom portions can be stacked together for easy transport; however, this is not required. This stacking arrangement illustrated in FIGS. 10 and 12 can also be used to save space when storing and/or transporting one or more portable toilets. As illustrated in FIG. 14, a plurality of side walls can be stacked together to facilitate in the easy and convenient storage and/or transport of the side wall. Also, the stacking of a plurality of side walls can be used to save space when storing and/or transporting one or more portable toilets. As will be described in more detail below, a portion of the toilet system can be configured to be collapsible, thus being able to be stored between a set of stacked top and bottom sections as illustrated in FIG. 11; however, this is not required. Such a collapsible toilet system, when used, can be used to facilitate in the easy and convenient storage and/or transport of the components of the portable toilet. As can be appreciated, the modular configuration of the portable toilet results in easier and more convenient storing, transporting and cleaning of the portable toilet as compared to prior art portable toilets.

As mentioned above, the side wall of the portable toilet is intended to be disposed after the portable toilet is disassembled after being used. The side wall is generally formed of a disposable material, and typically a disposable and recycled material. The side wall can also be recycled after use or disposed in a landfill or other disposal location. Since the side wall is not designed to be cleaned after use, the amount of cleaning, the time to clean, and the cleaning materials required to clean the portable toilet are reduced as compared to prior art portable toilets.

As also mentioned above, the portable toilet of the present invention can be easily customized for various sponsors. The side wall of the portable toilet can be formed of a material (e.g., paper board, cardboard, etc.) that can include printing for certain events. When forming the side wall for use with a portable toilet at a certain event, customized printing can be included on the outside and/or inside surfaces of the side wall; however, this is not required. For example, if PepsiCo Americas Foods was sponsoring a certain event, the outside surface of the side walls could include printing to look similar to a PepsiCo Americas Foods product (e.g., Pepsi can, Sierra Mist can, Slice can, Tropicana Can, Ocean spray can, etc.) and the upper portion 240 of the top section can be customized to look similar to the top of the product, thus when the portable toilet is assembled, the portable toilet looks similar to and advertises the product of the sponsor. When the portable toilet is to be used at a different location, the side wall of the portable toilet is disposed of after use, the top section, bottom section, door system (when reusable), and toilet system is cleaned and shipped to the different location. A new side wall can be created and printed to include printing for the different sponsor at the new event location. For instance, if The Coca-Cola Company was sponsoring the event at the new event location, the outside surface of the side walls could include printing to look similar to The Coca-Cola Company product (e.g., Coke can, Diet Coke can, A&W can, Squirt can, Dr. Pepper can, Minute Maid can, PowerAde bottle, etc.) and the upper portion 240 of the top section can be customized to look similar to the top of the product, thus when the portable toilet is assembled, the portable toilet looks similar to and advertises the product of the sponsor. As can be appreciated, if the upper portion 240 is generic for differently sponsored products, the upper portion 240 can be reused at different events; however, this is not required. As can also be appreciated, if the portable toilet is used at a different event that is sponsored by the same product sponsor, the side wall is still generally disposed of after each event and the other reusable components of the portable toilet are generally cleaned after each event. As can be appreciated from this non-limiting example, the outside appearance of the portable toilet of the present invention can be easily customized for use by different sponsors and/or to sponsor different products at one or more events.

Figure 21:
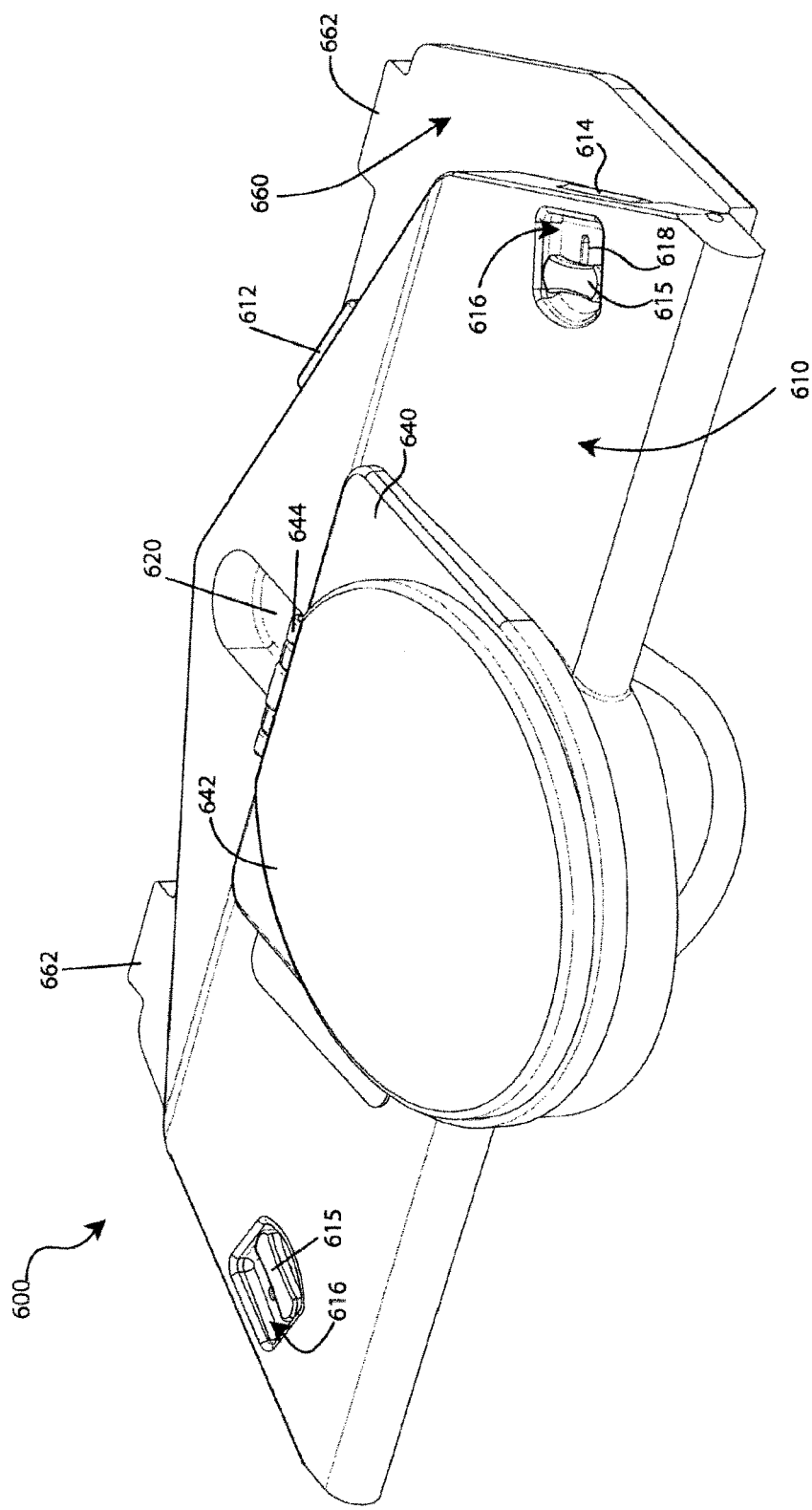
FIG. 21 is a front elevation view of one non-limiting collapsible toilet system in the collapsed position.
Figure 22:
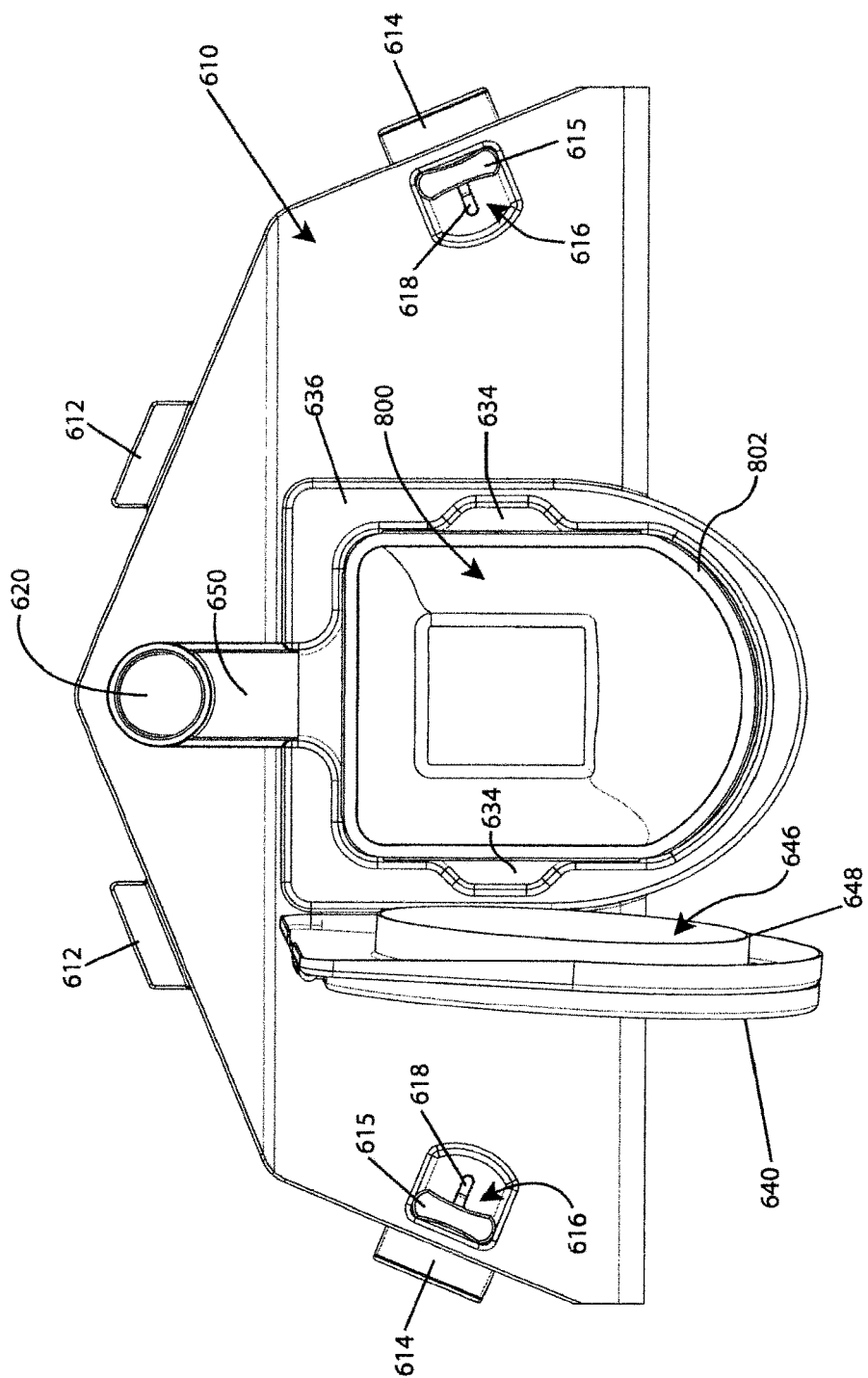
FIG. 22 is a top plan view of the collapsible toilet system of FIG. 21 wherein the toilet housing is in the open position.
Figure 23:
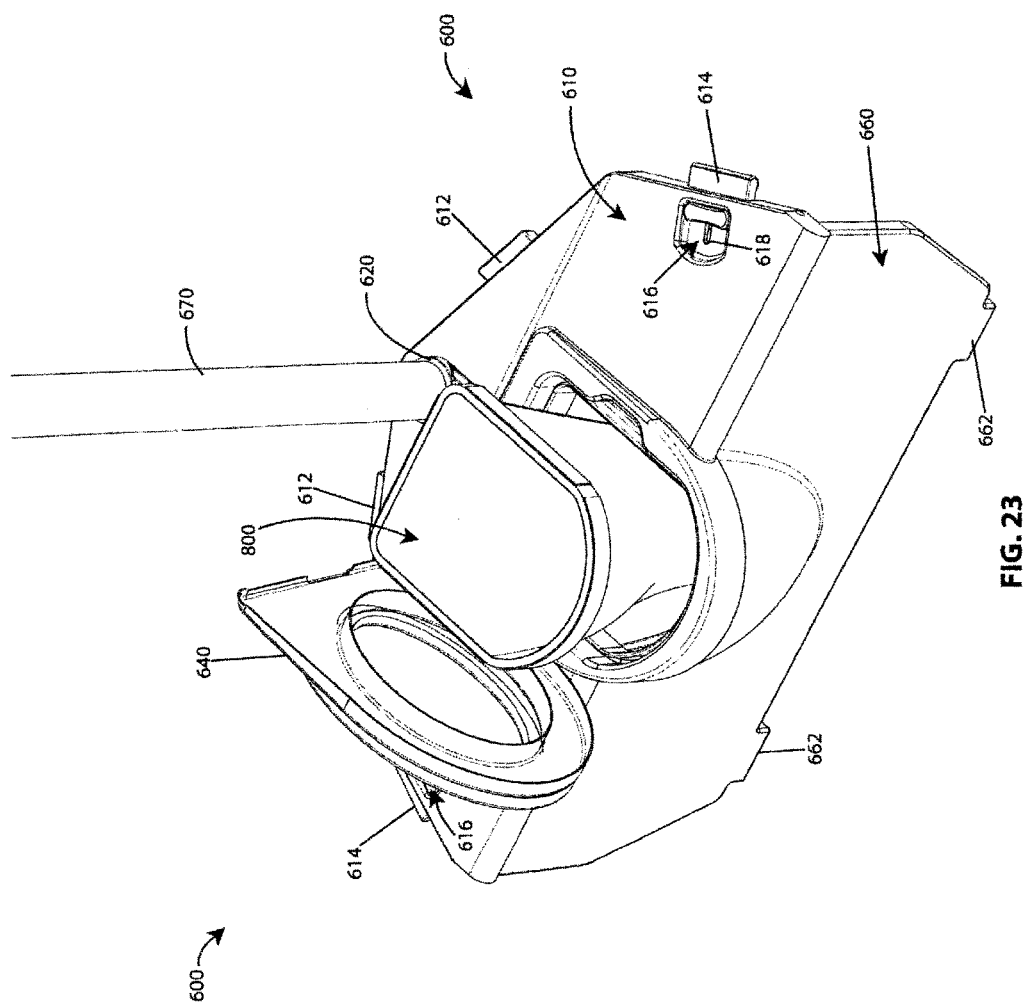
FIG. 23 is a front elevation view of the collapsible toilet system of FIG. 21 wherein the collapsible toilet system is in the non-collapsed position and the toilet housing is in the open position to receive a non-limited configuration of a disposable refuse receptacle.
Figure 28:
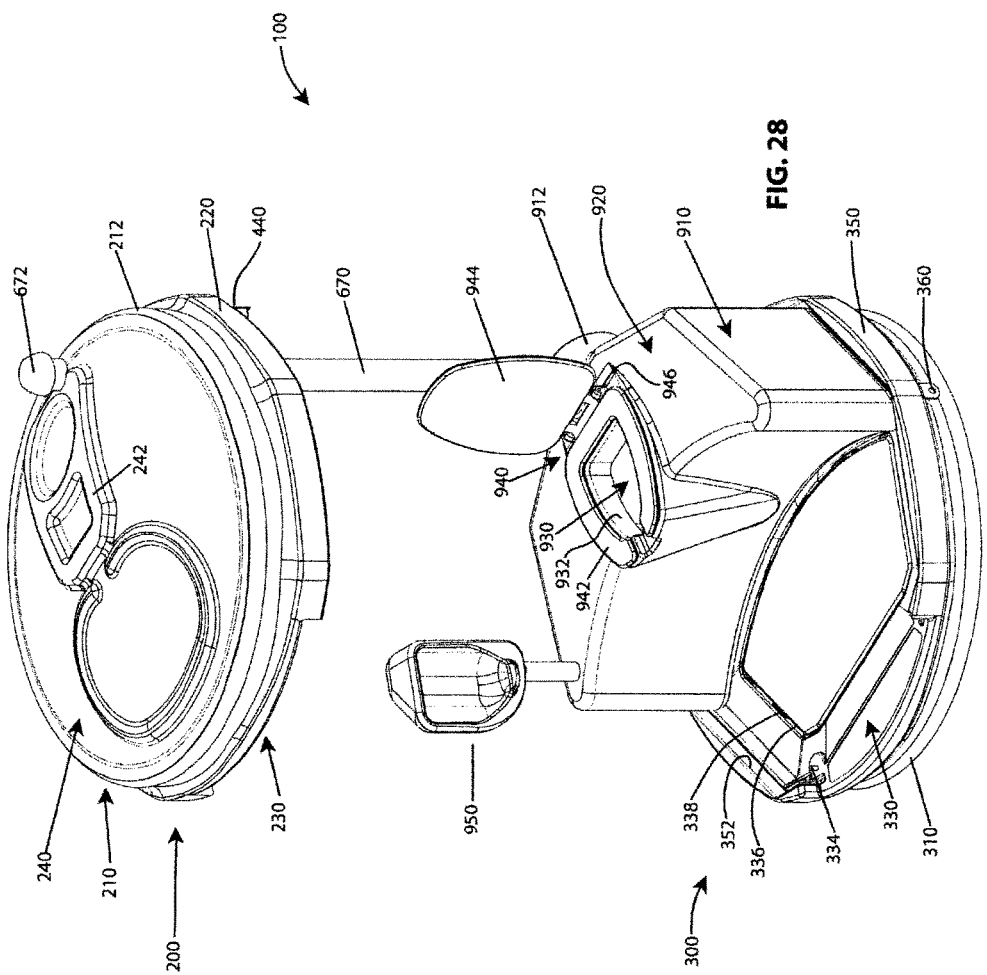
FIG. 28 is a front elevation view of another embodiment of the portable toilet that is absent the side wall and door system wherein a different toilet system is illustrated; and, FIG. 29 is a cross-sectional view of FIG. 28.
Figure 29:
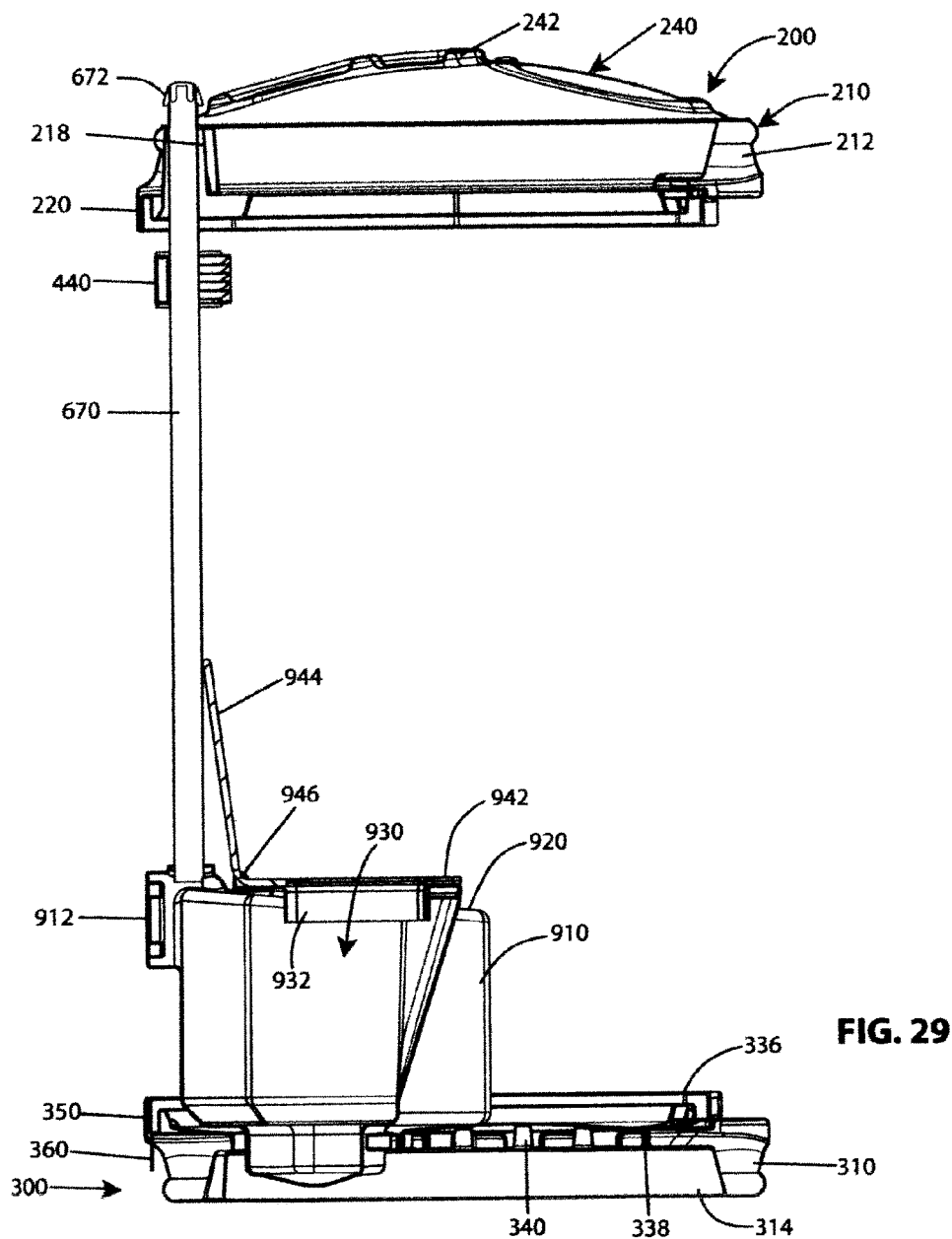

Referring now to FIGS. 3, 6, 7 11 and 21-23, there is illustrated one non-limiting toilet system 600 that can be used in the portable toilet of the present invention. FIGS. 28 and 29 illustrated another non-limiting toilet system 600 that can be used in the portable toilet of the present invention. As can be appreciated, many different configurations of toilet systems can be used in the portable toilet of the present invention. The size, shape, color and configuration of the toilet system are non-limiting. The toilet system illustrated in FIGS. 3, 6, 7, 11 and 21-23 is a collapsible toilet system. The toilet system 600 includes a seat section 610 and a pivoting bottom section 660. The bottom section can be pivotally connected to the seat section by one or more hinges and/or by some other means. FIG. 21 illustrates the bottom section in the collapsed or stored position and FIG. 23 illustrates the bottom section in the open position. The bottom edge of the bottom section can optionally include one or more tabs 662 that can be used to secure the bottom section in position in the interior of the portable toilet. As illustrated in FIG. 6, the bottom section 300 includes two toilet system connection arrangements 342 that are designed to receive tabs 662 when the toilet system is installed in the interior of the portable toilet. As can be appreciated, other or additional arrangements can be used to secure the bottom section of the toilet system to the base section 300.

The seat section 610 also includes one or more back tabs 612 that are designed to be inserted into a connection slot 450 in side wall 400 when the toilet system is installed in the interior of the portable toilet. The back tabs 612 are sued to support the seat section on the side wall of the portable toilet. As can be appreciated, other or additional arrangements can be used to secure and support the seat section to the side wall of the portable toilet. The seat section also can optionally include one or more lock tabs 614. The lock tabs are designed to be extendable and retractable; however, this is not required. FIGS. 22 and 23 illustrate the lock tabs in the extended position and FIG. 21 illustrates the lock tabs in the retracted position. The one or more lock tabs, when used, can secure and release the toilet system in the interior of the portable toilet. For instance, the bottom section of the toilet system can be folded down into the open position and tabs 662 can be inserted into connection arrangements 342, and the seat portion can be moved toward the side wall to cause back tabs 612 to be inserted into connection slots 450 on the side wall. Thereafter, the lock tabs 614 can be moved to extended position so that the front end of the lock tab is inserted into connection slots 450 in the side wall. The seat section includes a lock cavity 616 that includes a lock slot 618. The lock tab includes a handle 615 that can be moved in the lock cavity 616 to cause the lock tab to be moved between the extended and retracted position. As can be appreciated, other or additional arrangements can be used to cause the lock tab to be moved between the extended and retracted position. As can also be appreciated, a lock mechanism, not shown, can optionally be used to lock the lock tab in the extended and/or retracted portion.

The rear region of the seat section can optionally include a vent opening 620 that is designed to receive and/or support a vent tube 670. As illustrated in FIG. 3, the vent tube 670 can extend from the seat section to and through vent tube opening 218 in the top section 200 of the portable toilet. The top of the vent tube can optionally include a tube vent cover or cap 672. As can be appreciated, the vent tube can also or alternatively extend through the side wall; however, this is not required. As can also be appreciated, the location of vent opening 620 can be in other or additional regions on the seat section. As can also be appreciated, vent opening 620 can be eliminated if the vent tube extends through the side wall; however, this is not required.

The seat section includes a toilet opening 630. The toilet opening is designed to enable a removable disposable waste pouch 800 to be inserted and removed from the toilet opening. The toilet opening optionally includes a lower landing 632 that allows an outer edge 802 of the removable disposable waste pouch to be seated. The toilet opening optionally includes one or more side recesses 634 that are used to grasp the outer edge 802 of the removable disposable waste pouch when removing the removable disposable waste pouch from the toilet opening. An elevated seat rim 636 can be optionally included on the seat section and partially or fully encircle the toilet opening. A seat housing 640 can be designed to be inserted on and/or over the seat rim. The seat housing can be optionally hingeably or pivotally connected to one side of the seat section. As illustrated in FIG. 22, the seat housing is connected to the seat section and is in the open position so that a removable disposable waste pouch can be inserted in or removed from the toilet opening as illustrated in FIG. 23. FIGS. 3 and 21 illustrate the seat housing in the closed position. As can be appreciated, a locking arrangement can optionally be used to secure the seat housing in the closed position on the seat section. The seat housing includes an opening 646 and an optional rim about and downwardly from opening 648. A seat lid 642 is hingeably connected to the seat housing by a hinge 644. The lid is designed to cover opening 648 of the seat housing.

The seat section can optionally include a fume cavity 650 that enables fumes to flow from the removable disposable waste pouch and into vent tube 670 via a tube opening 674. As can be appreciated, other or additional arrangements can be used to enable the flow of fumes from the removable disposable waste pouch and into vent tube 670.

Figure 25:
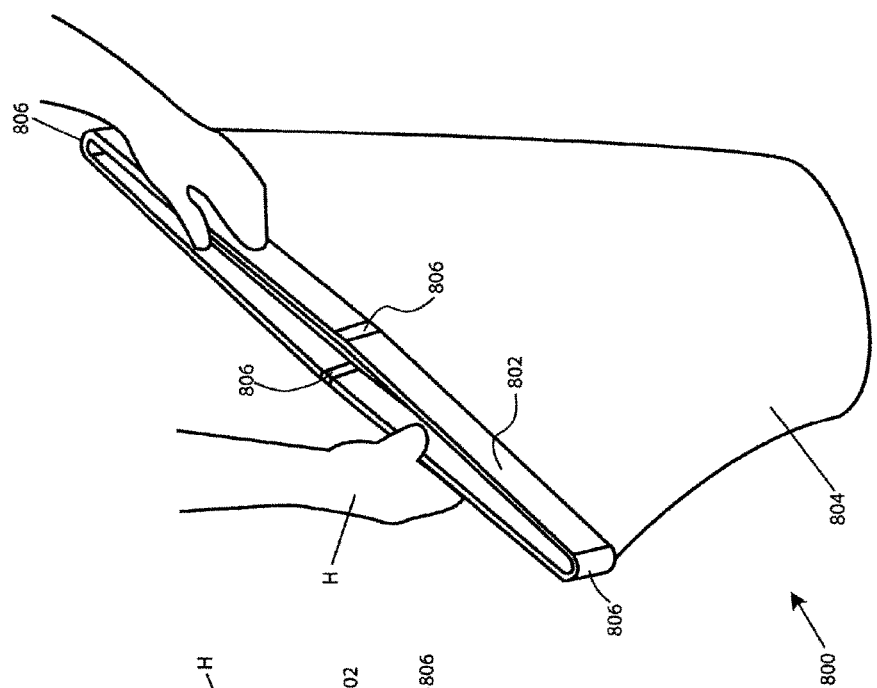
Figure 24:
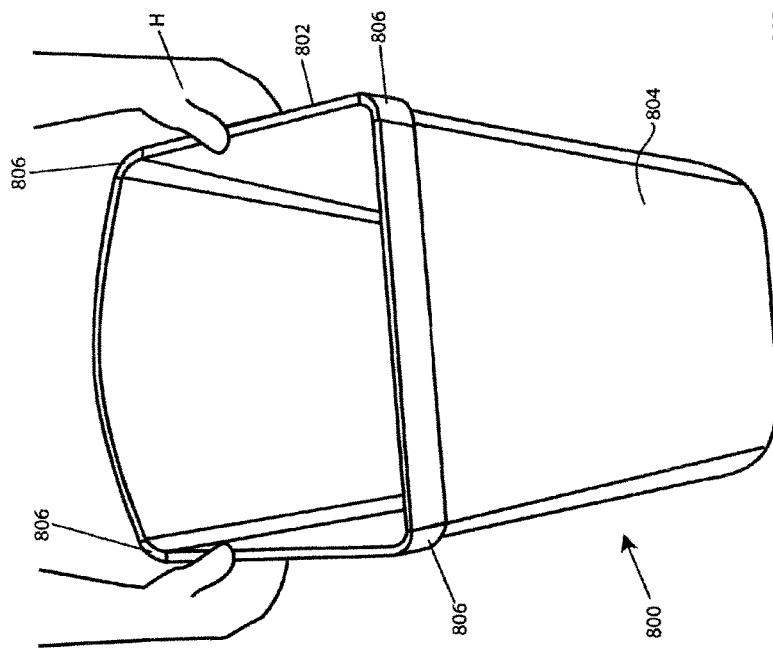

Referring now to FIGS. 24-27, the use of the removable disposable waste pouch 800 is illustrated in more detail. FIG. 24 illustrates the removable disposable waste pouch in the fully open position. A user can use his/her hands H to grasp the rim 802 of the removable disposable waste pouch when inserting and/or removing the removable disposable waste pouch from the toilet opening in the seat section of the toilet system. The rim can be optionally formed of different materials from the pouch portion 804 of the removable disposable waste pouch; however, this is not required. For example, the rim can be formed of rigid plastic or metal material and the pouch portion can be formed of a flexible material; however, this is not required. The pouch portion is generally formed of a liquid proof material; however, this is not required. The rim can be optionally formed to enable the removable disposable waste pouch to be conveniently closed for disposal. One such rim arrangement is illustrated in FIGS. 24-27 and the closing of the removable disposable waste pouch using such non-limiting rim configuration is illustrated in FIGS. 25-27. The rim can include one or more flexible sections 806 that can be used to facilitate in the bending of the rim in certain locations; however, this is not required. The size, shape, configuration and materials of the removable disposable waste pouch are non-limiting. Generally, the size and shape of the removable disposable waste pouch is selected to be easily and conveniently inserted into and removed from the toilet opening in the seat section when the seat housing is in the open position.

Referring now to FIGS. 28 and 29, the portable toilet can include a differently configured toilet system 900. The other components of the portable toilet are generally the same as the portable toilet illustrated and described in FIGS. 1-19, thus similar structures will retain the same reference numbers and will not be described again. The toilet system includes a tank 910 that is used to store refuse. The tank can include chemicals to treat the refuse in the tank and/or to counter the odor in the tank; however, this is not required. The back side of the tank can include a drain opening 912 that can be used to remove fluids and solids from the tank and to facilitate in cleaning the tank. The drain opening can be used to insert treatment fluid into the tank; however, this is not required. When a drain opening is used, the side wall generally includes an opening to allow access to the drain opening; however, this is not required. The drain opening generally includes a removable cover. The top surface 920 of the tank includes a toilet opening 930. An opening rim 932 can optionally extend downwardly from the toilet opening. A toilet seat 940 is generally connected to the top surface of the tank to partially or fully cover the toilet opening; however, this is not required. The toilet seat can include a seat rim 942 and a seat cover 944; however, this is not required. The seat cover and/or seat rim can be hingeably connected by a hinge 946 to enable the components to open and close; however, this is not required. The toilet system can optionally include a urinal 950 that is connected to the tank 910. As can be appreciated, the size, shape, configuration and materials of the toilet system are non-limiting.

It will thus be seen that the objects set forth above, among those made apparent from the preceding description, are efficiently attained, and since certain changes may be made in the constructions set forth without departing from the spirit and scope of the invention, it is intended that all matter contained in the above description and shown in the accompanying drawings shall be interpreted as illustrative and not in a limiting sense. The invention has been described with reference to preferred and alternate embodiments. Modifications and alterations will become apparent to those skilled in the art upon reading and understanding the detailed discussion of the invention provided herein. This invention is intended to include all such modifications and alterations insofar as they come within the scope of the present invention. It is also to be understood that the following claims are intended to cover all of the generic and specific features of the invention herein described and all statements of the scope of the invention, which, as a matter of language, might be said to fall therebetween. The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

We claim:

1. A method for using a portable toilet that can be assembled and disassembled and which is formed of non-reusable and reusable sections comprising:
   providing a top section, said top section configured to be reusable for multiple instances of assembly and disassembly of said portable toilet at one or more locations;
   providing a bottom section, said bottom section configured to be reusable for multiple instances of assembly and disassembly of said portable toilet at said one or more locations;
   providing a side wall, said side wall configured to be used a single time for one instance of assembly and disassembly of said portable toilet at one location and to be disposed of after said one instance of assembly and disassembly of said portable toilet at said one location, said sidewall in the form of a bendable flat sheet;
   transporting said top section, said bottom section and said side wall to a of the one or more locations first location for assembly of said portable toilet;
   assembling said portable toilet at said first location, said steps of assembling including:
     placing said bottom section on a surface to be used to assemble said portable toilet;
     bending said flat sheet of said side wall into a bent state to form a plurality of primary sides, said primary sides having a generally equal width;
     releasably connecting a bottom edge of said side wall while in said bent state to said bottom section; and,
     releasably connecting a top edge of said side wall while in said bent state to said top section;
   using said portable toilet as a toilet at said first location;
   disassembling said portable toilet after use, said steps of disassembling including:
     disconnecting said top section from said side wall while in said bent state;
     disconnecting said bottom section from said side wall while in said bent state; and,
     disposing of said side wall; and,
   transporting said top section and said bottom section to a of the one or more locations second location for assembly with a different side wall.

2. The method as defined in claim 1, wherein said top section includes a top wall slot, said bottom section includes a bottom wall slot, said top edge of said side wall is removably insertable into said top wall slot when said portable toilet is assembled, said bottom edge of said side wall is removably insertable into said bottom wall slot when said portable toilet is assembled.

3. The method as defined in claim 1, wherein said portable toilet includes a door system, said door system includes a door frame and at least one door movably connected to said door frame, said side wall is removably connected to said door frame, said door system forms a portion of a side of said portable toilet when said portable toilet is assembled.

4. The method as defined in claim 3, wherein said door system detachably connects to said top and bottom sections when said portable toilet is assembled.

5. The method as defined in claim 3, wherein said side wall includes first and second door connecting sides after said step of bending said flat sheet of said side wall, each of said first and second door connecting sides has a frame edge that releasably connects to said door frame.

6. The method as defined in claim 5, wherein said first and second door connecting sides have a different width from each of said primary sides, said width of said first and second door connecting sides being generally equal.

7. The method as defined in claim 3, wherein said door system is at least partially formed of one or more materials selected from the group consisting of plastic, composite materials, fiberglass, and carbon fiber material, said door system is formed of a material that is different from said material of said side wall, said door system is configured to be reusable for multiple instances of assembly and disassembly of said portable toilet at said one or more locations.

8. The method as defined in claim 1, wherein said side wall includes a plurality of grooves or slots configured to enable flat sheet to be bent at each of said grooves or slots to enable said side wall to be bent along said grooves or slots during said assembly of said portable toilet to form said primary sides of said side wall.

9. The method as defined in claim 1, wherein said top section and said bottom section is at least partially formed of one or more materials selected from the group consisting of plastic, composite materials, fiberglass, and carbon fiber material, said side wall is formed of a bendable, biodegradable, disposable and recyclable material that includes cellulose, and which material includes one or more materials selected from the group consisting of paper board, cardboard material, press board, and fiberboard material, said material used to form said side wall is different from said material used to form said top section and said bottom section.

10. The method as defined in claim 1, wherein said portable toilet includes a toilet assembly that is removably positioned in a toilet cavity of said portable toilet, said toilet cavity is configured to be accessible by a user when said portable toilet is assembled, said toilet assembly includes a seat section that is releasably connected to said bottom section when said portable toilet is fully assembled, said seat section is configured to be used multiple instances of assembly and disassembly of said portable toilet.

11. The method as defined in claim 1, wherein said top section includes an upper portion and a lower portion, said lower portion is configured to releasably connect to said side wall when said portable toilet is assembled, said upper portion is configured to releasably connected to said lower portion.

12. The method as defined in claim 1, wherein said top section and said bottom section are configured to be stackable on one another when being transported to said first location.

13. The method as defined in claim 12, wherein a seat section of a toilet assembly is configured to be insertable between said top section and said bottom section when said top section and said bottom section are stacked together.

\* \* \* \* \*